(12) United States Patent
Iijima et al.

(10) Patent No.: US 6,839,081 B1
(45) Date of Patent: *Jan. 4, 2005

(54) VIRTUAL IMAGE SENSING AND GENERATING METHOD AND APPARATUS

(75) Inventors: Katsumi Iijima, Hachioji (JP); Jun Tokumitsu, Sagamihara (JP); Masakazu Matsugu, Ohamishirasato-machi (JP); Kotaro Yano, Yokohama (JP); Sunao Kurahashi, Kawasaki (JP); Toshiaki Kondo, Fujisawa (JP); Katsuhiko Mori, Kawasaki (JP); Motohiro Ishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/525,289

(22) Filed: Sep. 8, 1995

(30) Foreign Application Priority Data

Sep. 9, 1994 (JP) .............................................. 6-216323
Jun. 21, 1995 (JP) .............................................. 7-154654
Jun. 30, 1995 (JP) .............................................. 7-166233

(51) Int. Cl.[7] ................................................. H04N 7/18
(52) U.S. Cl. .............................. 348/46; 348/43; 348/36; 348/39
(58) Field of Search .............................. 348/36, 39, 40, 348/43, 44, 46, 48, 49, 50, 169, 170, 171

(56) References Cited

U.S. PATENT DOCUMENTS

| 4,956,706 A | | 9/1990 | Ohba |
| 5,497,188 A | * | 3/1996 | Kaye ............................ 348/36 |
| 5,905,525 A | * | 5/1999 | Ishibashi et al. .............. 348/39 |

FOREIGN PATENT DOCUMENTS

| EP | 0 498 542 A3 | 1/1992 |
| FR | 2 633 474 | 2/1989 |
| WO | WO 93/14467 | 7/1993 |

OTHER PUBLICATIONS

European Search Report (dated Dec. 22, 1995) for Application # EP 9530 6297.
Patent Abstracts of Japan, vol. 15, No. 11, Jan. 10, 1991 (Abstract of JP 2255990, Oct. 16, 1990).
Patent Abstracts of Japan, vol. 17, No. 505, Sep. 10, 1993 (Abstract of JP 5128261, May 25, 1993).

* cited by examiner

*Primary Examiner*—Andy Rao
(74) *Attorney, Agent, or Firm*—Morgan & Finnegan, LLP

(57) ABSTRACT

An image sensing apparatus includes an image input unit (100) for inputting an image, a detection unit (200) for detecting a state of movement of the image input unit (100) in an image input operation, a storage unit (310, 9000) for storing a plurality of images input by the image input unit (100) and movement information corresponding to the state of movement detected by the detection unit (200), and an image generating unit (320) for generating an image from an arbitrary viewpoint position on the basis of the plurality of images and the movement information stored in the storage unit.

40 Claims, 29 Drawing Sheets

F I G. 10
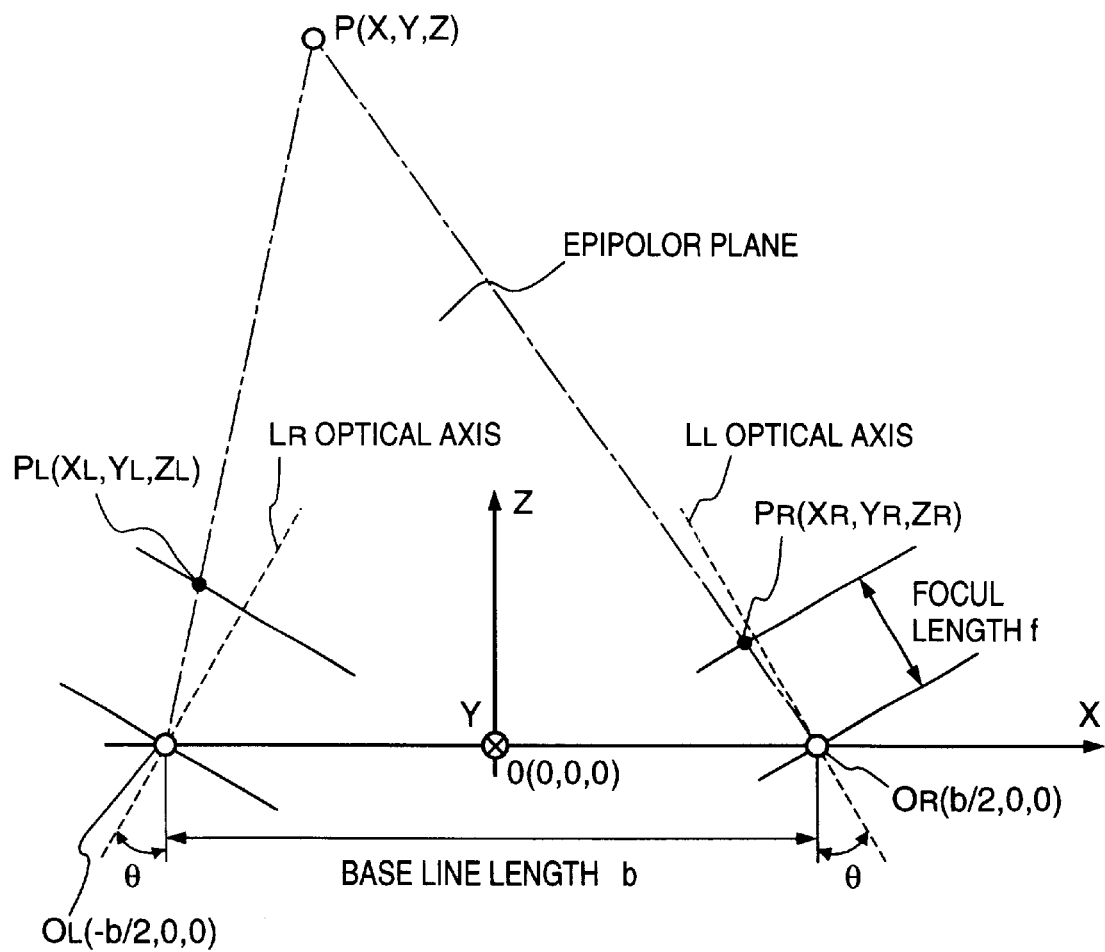

VIRTUAL IMAGE SENSING AND GENERATING METHOD AND APPARATUS

BACKGROUND OF THE INVENTION

1. Field of the Invention

The present invention relates to an image processing method and apparatus which sense an object (to be sensed) by using a plurality of image sensing systems or a single image sensing system and reproduce a three- or two-dimensional image from the sensed image.

2. Description of the Related Art

Distance measuring devices for measuring the distance to an object to be photographed can be roughly classified into distance measuring devices based on active methods of irradiating some kind of energy onto the object and distance measuring devices based on passive methods of analyzing an image signal sensed by a photoelectric conversion element or the like.

Active methods which are widely used are: a method of irradiating a wave, e.g., a radio wave, an ultrasonic wave, or light, onto an object and measuring the distance to the object on the basis of the propagation time required for the irradiated wave to return upon reflection; and a method (e.g., Moiré topography) of obtaining the shape of an object to be photographed from the geometric distortion of an artificial pattern formed on the object surface by projecting a regular pattern from an appropriate light source.

Passive methods are: a method of measuring a distance, on the basis of the principle of trigonometrical survey, from the positional relationship between corresponding points of images obtained by using a plurality of image sensors; and a method of obtaining the three-dimensional structure of an object to be photographed from the geometric distortion of a pattern on the object surface. In addition, attempts have been made to use a method of obtaining the distance to an object on the basis of images sensed by a plurality of image sensing processing systems having different focal lengths.

As described above, in various conventional methods, the three-dimensional shape of an object is measured to extract three-dimensional information, and a three-dimensional image is reproduced on the basis of the three-dimensional information.

In general, in order to reproduce images, sensed image data and images viewed from predetermined viewpoints and formed by interpolation on the basis of sensed data are stored in advance. In reproducing images, images are selected from the stored images to be displayed.

Several problems are posed in realizing the above various problems.

First of all, there are problems associated with extraction of three-dimensional information required to generate a reproduced image. More specifically, in the above conventional methods, since energy such as an ultrasonic wave or a laser beam must be irradiated on an object to detect the reflecting object, measurement cannot be performed for any object which absorbs the energy. In addition, a strong laser beam cannot be irradiated on a human body in consideration of adverse effects on the human body. That is, the above active methods are poor in versatility. Furthermore, the method of projecting a regular pattern is basically a method used to obtain the relative three-dimensional information of an object so that an absolute distance until the object can not be acquired.

Of the passive methods, the method of using a plurality of image sensors requires a plurality of image sensing elements and image sensing systems and hence is not suitable for a compact, inexpensive distance measuring device. In the method of extracting three-dimensional information from the geometric distortion of a pattern on an object surface, the characteristics of the geometric pattern must be known in advance, and obtained information is only relative distance information. For this reason, the application range of this method is very narrow. In addition, a distance measuring device based on a focus error with respect to an image requires a bright lens with a small depth of focus and a large numerical aperture to perform accurate distance measurement. For this reason, sufficient resolution cannot be obtained by using a general TV camera lens.

The above problems are posed in measuring the three-dimensional shape of an object or an object to be photographed. Secondly, there is no conventional apparatus which reproduces an image viewed from an arbitrary viewpoint position and an arbitrary viewpoint direction from images obtained by sensing an object to be photographed. For example, a conventional video apparatus can only reproduce an image under the same condition as that in a recording operation. This will be described with reference to FIG. 1. When a photographing operation is performed by a general camera, an image is obtained in accordance with the TV frame (field) frequency, as shown in FIG. 1. In reproducing this image, forward reproduction is performed from the position denoted by reference numeral 181 in FIG. 1, or reverse reproduction is performed from the position denoted by reference numeral 182. An image reproduction order cannot be set in accordance with a designated order based on an arbitrary viewpoint position and an arbitrary position of line of sight.

As described above, since many image data including many interpolated image data must be held to reproduce an image, a large-capacity memory is needed. In addition, a much retrieval time is required to pick up one of image data which has been stored in the memory. Owing to the limited memory capacity, it is not practical to retain all images viewed from various viewpoints.

SUMMARY OF THE INVENTION

The present invention has been made to solve the above problem, and has its object to provide an image sensing/reproducing apparatus which can easily obtain a three- or two-dimensional image viewed from an arbitrary viewpoint and an arbitrary viewpoint direction.

It is another object of the present invention to provide an image processing method and apparatus in which the storage capacity of a recording unit which is required to reproduce images viewed from various viewpoint directions is small.

It is still another object to provide an image processing method and apparatus which can accurately obtain the information of the distance to an object to be photographed without irradiating special energy onto the object.

It is still another object to provide an image processing method and apparatus which can easily obtain the moving direction and amount of an image sensing apparatus and accurately reproduce an image on the basis of the obtained information.

The foregoing object is attained by providing an image sensing apparatus comprising: image input means for inputting an image; detection means for detecting a state of movement of said image input means in an image input operation; storage means for storing a plurality of images input by said image input means and movement information corresponding to the state of movement detected by said detection means; and image generating means for generating an image from an arbitrary viewpoint position on the basis of the plurality of images and the movement information stored in said storage means.

The foregoing object is further attained by providing an image sensing met hod comprising: image input step of inputting an image using image input means; detection step of detecting a state of movement of said image input means in an image input operation; storage step of storing a plurality of images input at said image input step and movement information corresponding to the state of movement detected by said detection step; and image generating step of generating an image from an arbitrary viewpoint position on the basis of the plurality of images and the movement information stored in said storage step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 10 is a view schematically showing a state wherein an object point P is projected on an image sensing sensor;

DETAILED DESCRIPTION OF THE PREFERRED EMBODIMENTS

Figure 1:
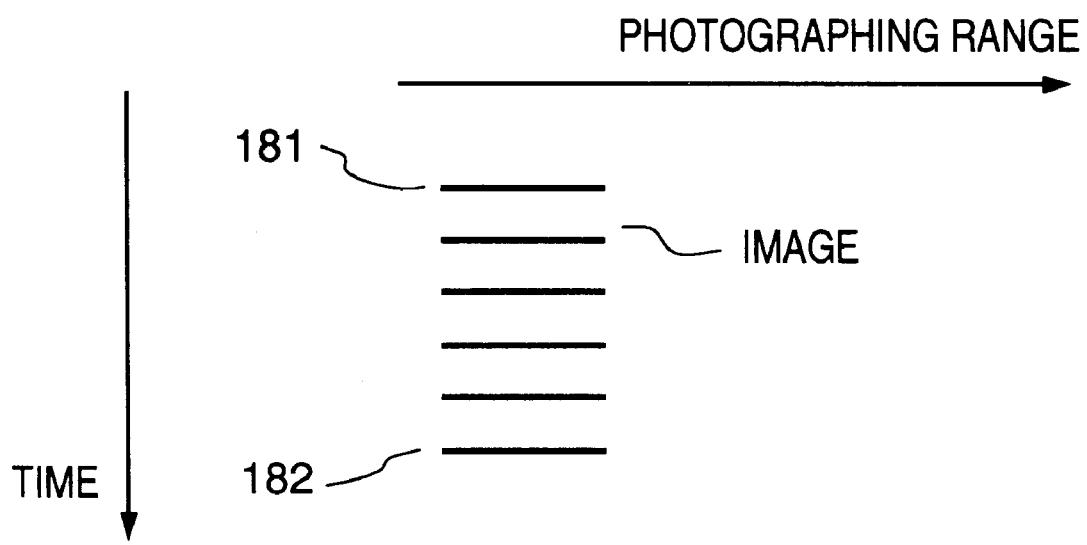
FIG. 1 is a view showing a conventional image sensing method and a conventional reproduction method.

Preferred embodiments of the present invention will be described in detail in accordance with accompanying drawings.

The hardware arrangement of an image processing apparatus according to an embodiment of the present invention will be briefly described with reference to FIG. 2.

Reference numeral 2005 denotes an image sensing unit for generating image data by sensing an object to be photographed. The generated image data is processed when a MPU (MicroProcessor Unit) 2000 sequentially executes various image processing programs (to be described later) stored in a ROM 2002. A RAM 2001 is used as a working area required for this processing.

The image data input from the image sensing unit 2005 is stored in an image memory 2006. Image data generated by interpolation processing (to be described later) is also stored in the image memory 2006.

A display I/F (InterFace) 2003 performs control to display the image data as a result of the above processing based on various image processing programs on a display 2004.

An MM I/F (Man-Machine InterFace) 2007 performs data input control of various input devices for inputting various command/data, e.g., a pen 2011, a mouse 2010, a joy stick 2009, and a polhemus sensor (trademark registration by Polhemus Corp.) 2008.

[First Embodiment]

The arrangement of a single-eye image sensing system as one form of the image sensing unit of the present invention will be mainly described next with reference to FIG. 3.

Blocks 100 and 200 respectively indicated by the broken lines are an image input unit and a moving amount detection unit for the image input unit 100. These blocks 100 and 200 constitute the image sensing unit 2005 in FIG. 2. The block 100 is an image input unit for inputting an image data from an object (not shown). Reference numeral 110 denotes an image sensing lens for sensing an object to be measured; 120, an image sensing element such as a CCD; 130, a sample hold (S/H) circuit for holding an output signal from the image sensing element (CCD) 120; 140, automatic gain control (AGC) circuit; and 150, an analog/digital (A/D) converter.

The block 200 is a moving amount detection unit for detecting the moving amount and direction of the image input unit 100. Reference numeral 210 denotes an angular velocity sensor such as a vibration gyroscope; and 220, a moving amount calculation circuit for calculating the moving amount and direction of the image input unit 100 from the angular velocity detected by the angular velocity sensor 210.

The angular velocity sensor 210 is designed to perform detection in three axial directions, i.e., the x-, y-, and z-axis directions. The moving amounts output from the moving amount calculation unit 220 can be output as moving amounts Bx, By, and Bz along the x-, y-, and z-axes. Alternatively, the overall moving amount can be output, as indicated by:

$$B=\sqrt{\sqrt{Bx^2 0By^2 0Bz^2}}$$

The moving amount output from the moving amount detection unit 200 is buffered in a memory 9000 of a main processing unit 320, and is output from the main processing unit 320 as needed.

Note that the memory 9000 is assigned to a RAM 2001.

Figure 2:
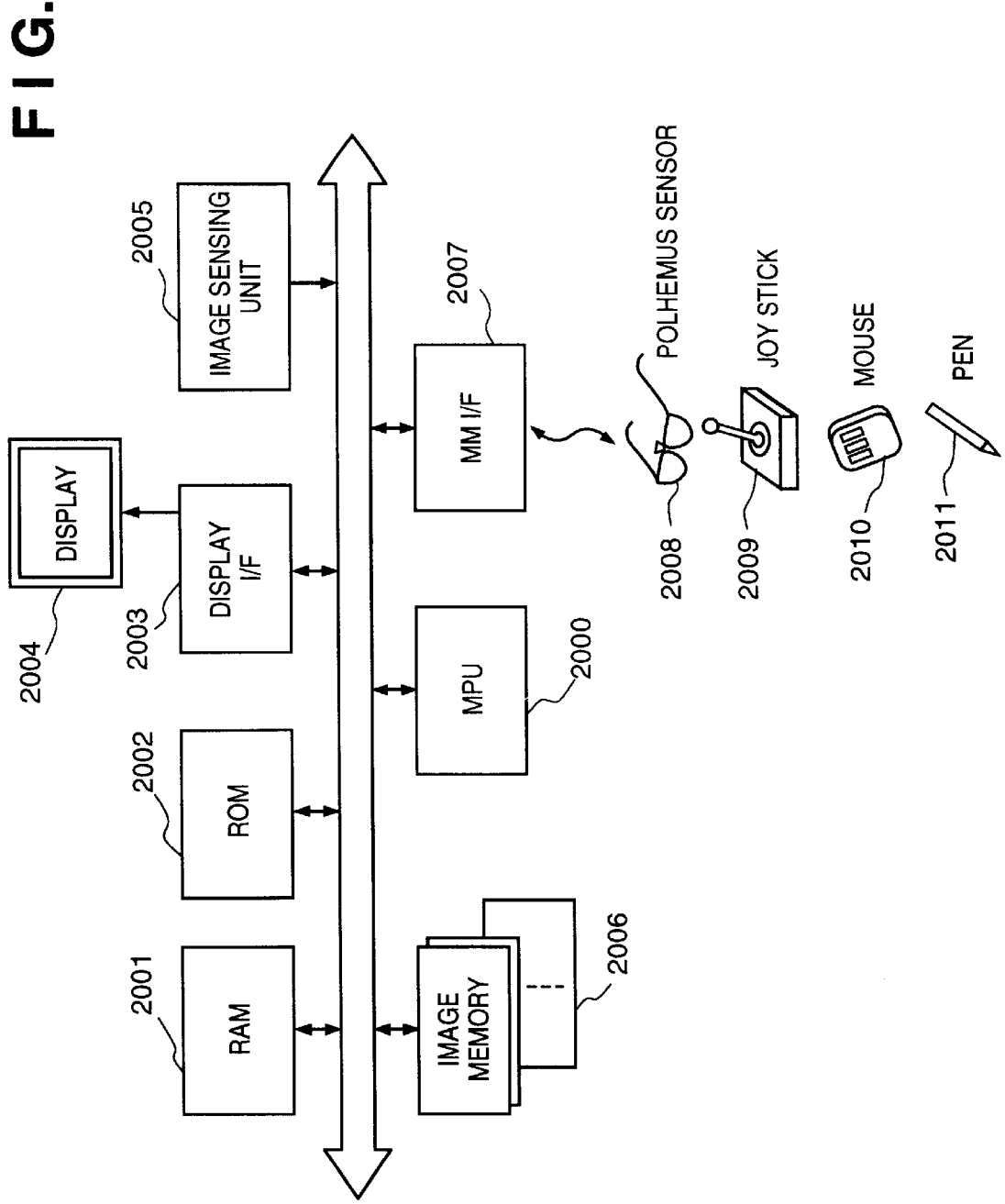
FIG. 2 is a block diagram showing the arrangement of an image processing apparatus according an embodiment of the present invention.

A block 300 indicated by the broken line is an image processing unit for calculating the distance to an object to be measured by causing the respective units other than the image sensing unit 2005 in FIG. 2 to execute image signal processing. Reference numeral 310 denotes an image memory assigned to a partial area of the image memory 2006 in FIG. 2 and used to hold image data for a predetermined period of time; and 302, the main processing unit for image processing.

The main processing unit 320 inputs viewpoint locus data 330 and generates images corresponding to the respective viewpoints from image data sensed at time n and time n−1 and input from the A/D converter 150 and an image memory 310.

The viewpoint locus data 330 is input through various data input devices connected to the MM I/F 2007.

Note that processing performed by the main processing unit 320 will be described in detail later.

The image sensing lens 110 forms an image of the object on the image sensing element 120. The image sensing element 120 photoelectrically converts the formed image of the object. The S/H circuit 130 holds the output from the image sensing element 120. The AGC circuit 140 then controls the gain of an image signal. The A/D converter 150 analog/digital-converts the output from the AGC circuit 140, and outputs the resultant digital image as image data.

The angular velocity sensor 210 detects the movement of the image input unit 100 itself. The moving amount calculation unit 220 calculates the moving amount of the image input unit 100 from the detected angular velocity of the image input unit 100, and outputs it to the image processing unit 300. This moving amount corresponds to a baseline length in a stereoscopic display.

The image memory 310 stores the image data from the image input unit 100 for a predetermined period of time and allows the main processing unit 320 to perform calculation between images in a time serial order.

Figure 3:
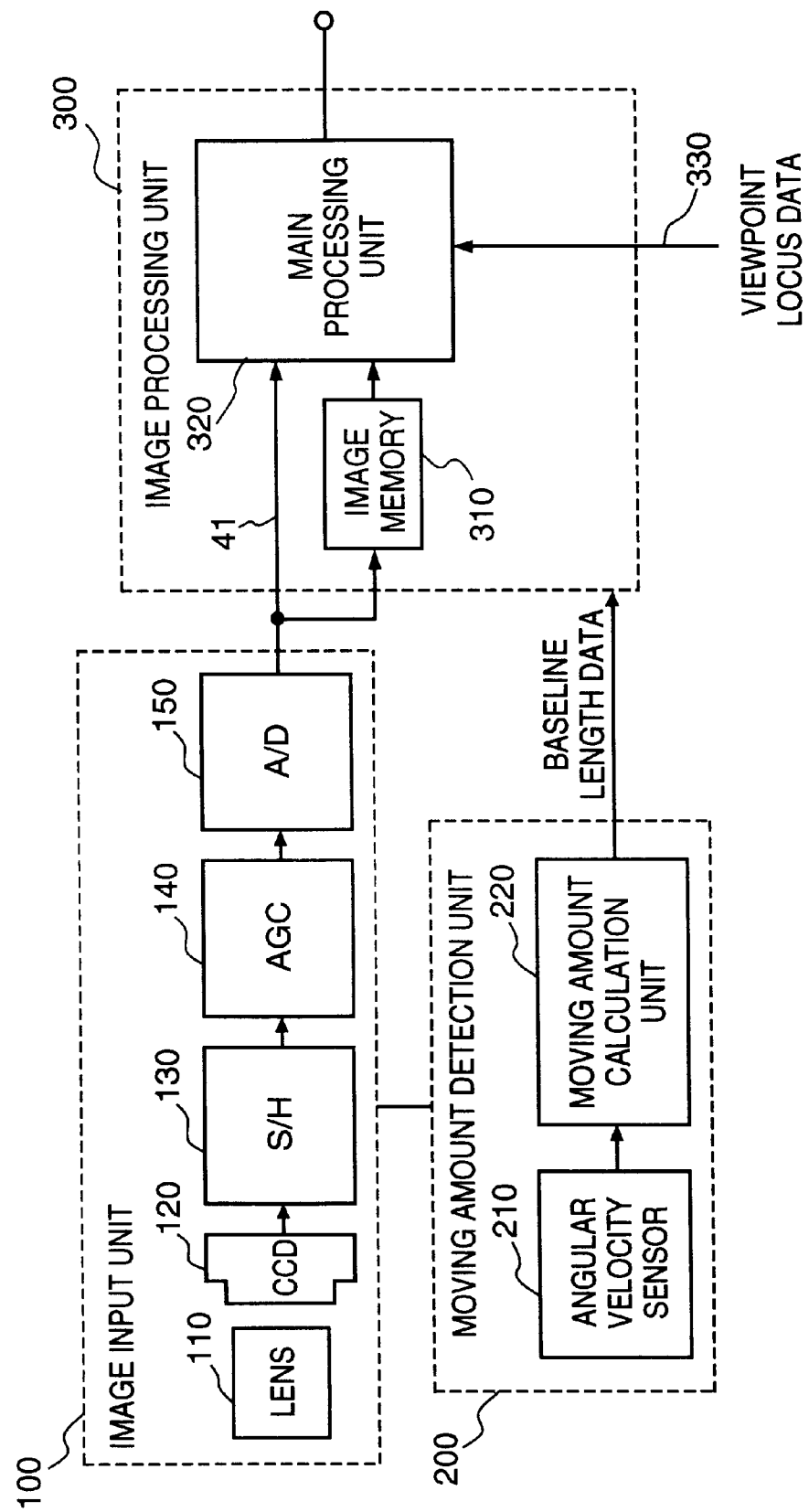
FIG. 3 is a block diagram showing the arrangement of an image processing apparatus according to the first embodiment of the present invention.

The arrangement shown in FIG. 3 is constituted by the single-eye image sensing system. However, the arrangement may be constituted by a multi-eye image sensing systems. An embodiment using this multi-eye image sensing unit will be described below with reference to FIG. 4.

Figure 4:
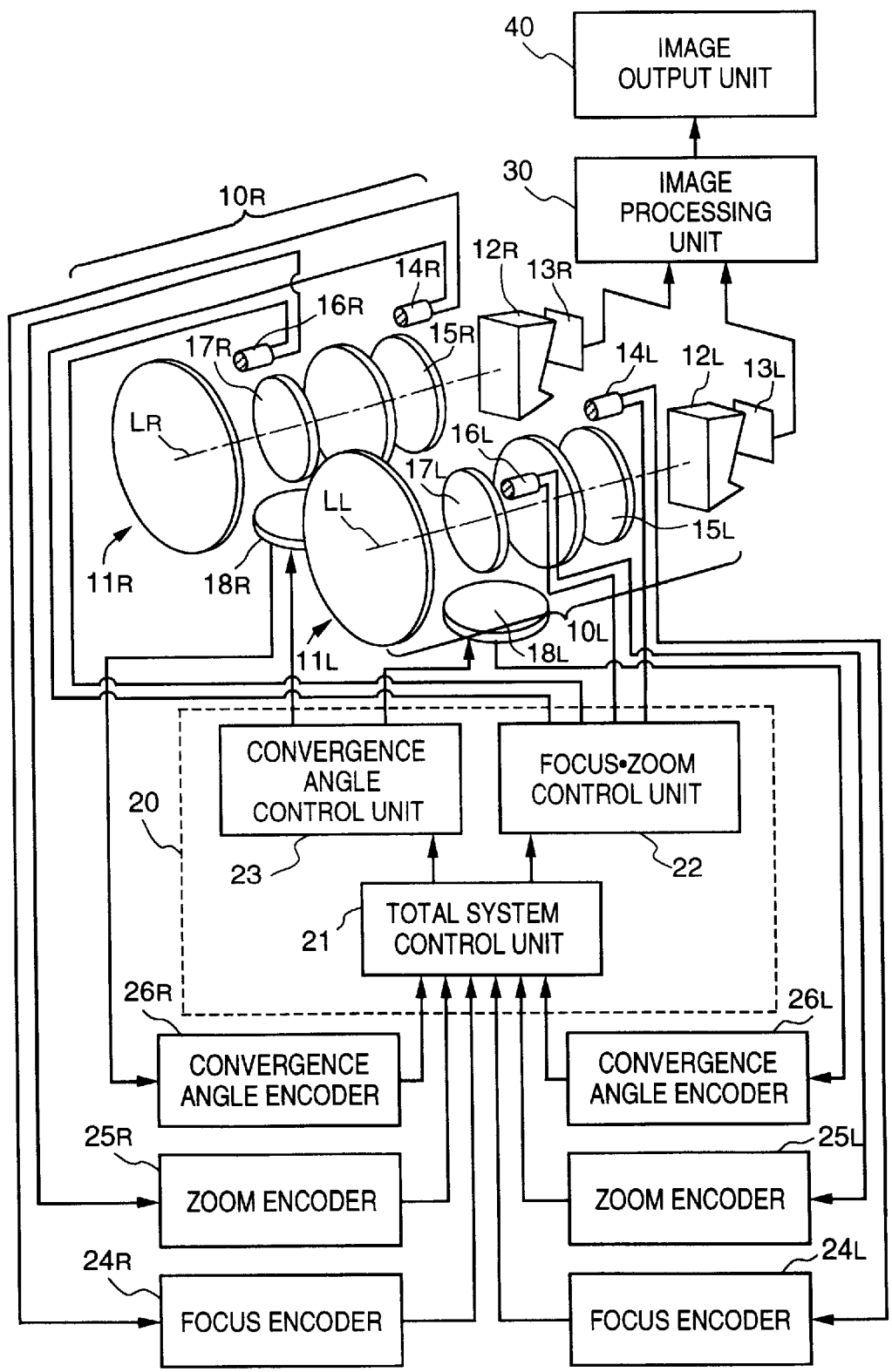
FIG. 4 is a view showing an example of the arrangement of a multi-eye image sensing unit.

Referring to FIG. 4, the multi-eye image sensing unit of this embodiment is designed to sense an object to be photographed by using two image sensing systems, i.e., right and left image sensing systems $10_R$ and $10_L$.

The left image sensing system $10_L$ will be described first. The left image sensing system $10_L$ includes an image sensing lens group $11_L$ as an imaging optical system incorporated in a lens barrel (not shown), a color separation prism $12_L$ attached to the image sensing lens group $11_L$ to separate light from an object to be photographed into light beams of three primary colors, and three CCD sensors $13_L$ (only one is shown) respectively having rectangular effective light-receiving portions and serving as image sensing elements arranged for the respective light beams of the colors separated by the color separation prism $12_L$.

The image sensing lens group $11_L$ is constituted by a focusing lens group $15_L$ driven by a focus motor $14_L$, and a plurality of lenses including a various magnification lens group $17_L$ driven by a zoom motor $16_L$. The motors $14_L$ and $16_L$ are driven in accordance with control signals from a total system control unit 21 and a focus/zoom control unit 22 in a control unit 20 for controlling the optical system. The right image sensing system $10_R$ has the same arrangement as that of the left image sensing system $10_L$. An optical axis $L_R$ of an image sensing lens group $11_R$ of the right image sensing system $10_R$ is on the same plane as that of an optical axis $L_L$ of the image sensing lens group $11_L$ of the left image sensing system $10_L$.

The lens barrels incorporating the image sensing lens groups $11_L$ and $11_R$ are respectively coupled to the rotating shafts of convergence angle motors $18_L$ and $18_R$ driven in accordance with control signals from a convergence angle control unit 23. The rotating shafts of the convergence angle motors $18_L$ and $18_R$ extend in a direction perpendicular to a plane including the optical axes $L_L$ and $L_R$ of the image sensing lens groups $11_L$ and $11_R$. When the convergence angle motors $18_L$ and $18_R$ are driven, the image sensing lens groups $11_L$ and $11_R$ are rotated together with the color separation prisms $12_L$ and $12_R$ and the CCD sensors $13_L$ and $13_R$ to set an angle (convergence angle) defined by the optical axes $L_L$ and $L_R$ of the image sensing lens groups $11_L$ and $11_R$.

The right image sensing systems $10_L$ and $10_R$ respectively include focus encoders $14_L$ and $14_R$ for detecting the positions of the focusing lens groups $15_L$ and $15_R$, zoom encoders $25_L$ and $25_R$ for detecting the positions of the various magnification lens groups $17_L$ and $17_R$, and convergence angle encoders $26_L$ and $26_R$ for detecting convergence angles. These components may be components to be externally mounted, such as potentiometers, or components for detecting the positions and angles of the lens groups from signal information of driving systems, such as pulse motors, themselves.

An image processing unit 301 performs image processing similar to that performed by the main processing unit 320 (in FIG. 3).

An image output unit 40 serves to display image data processed/generated by the image processing unit 301 on the display 2004 (in FIG. 2) through the display I/F 2003 (in FIG. 2) and store processed/generated image data in the image memory 2006.

An image sensing method using an image sensing unit having the same arrangement as that in FIG. 3 or 4 will be described next.

Figure 5:
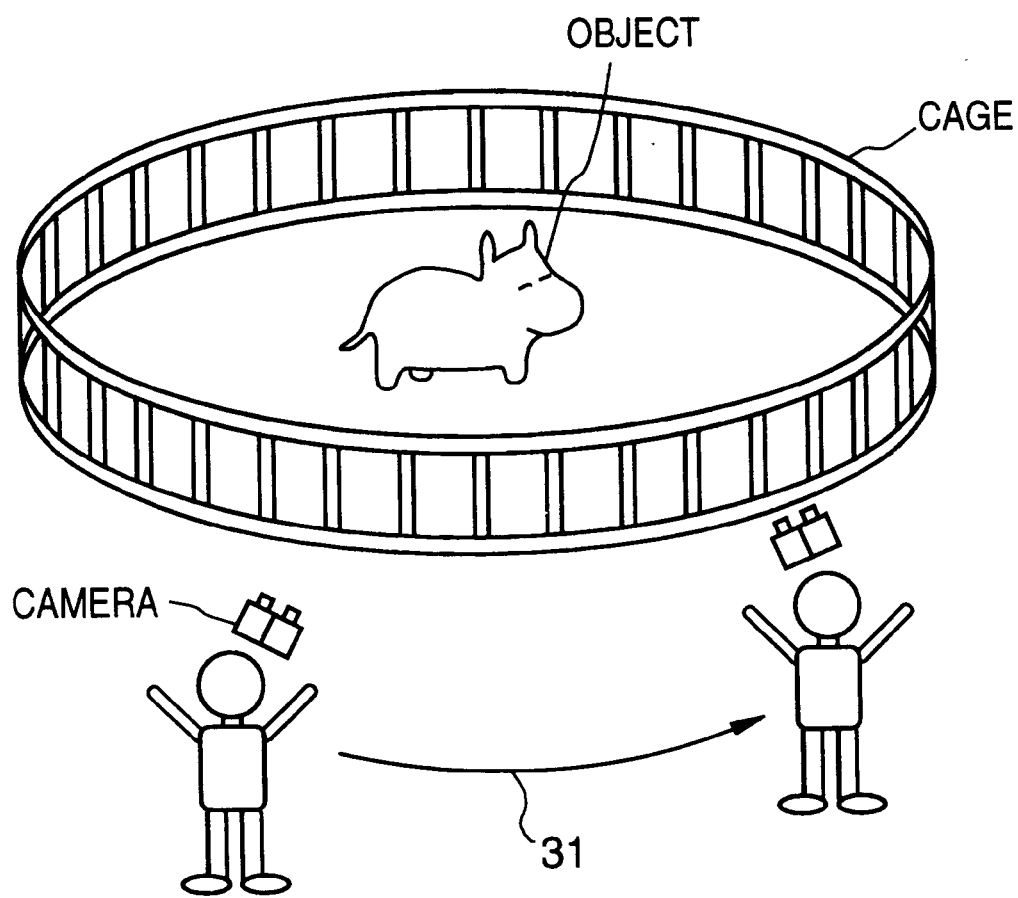
FIG. 5 is a view showing how an image sensing operation is performed.
Figure 6:
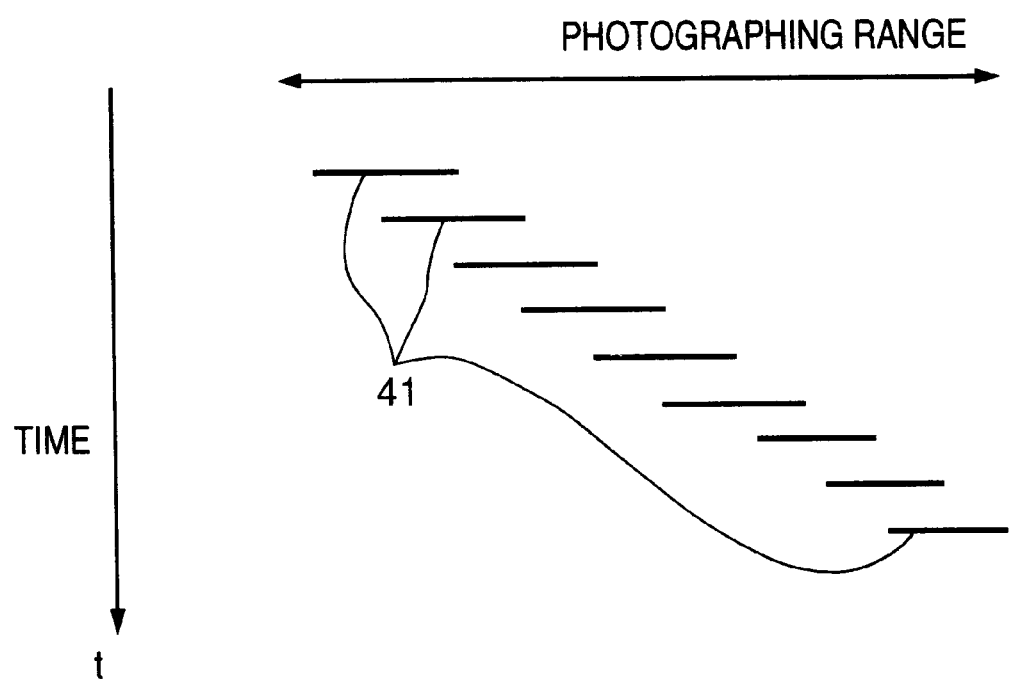
FIG. 6 is a view showing the relationship between the position of each image photographed in accordance with the photographing sequence in FIG. 5 and the time.

Assume that a photographing operation is performed in front of a cage in a zoo while an image sensing apparatus (camera) is moved in the direction indicated by an arrow 31, as shown in FIG. 5. FIG. 6 shows the relationship between the photographing position or the time of photography and the range of a sensed image in a case wherein the image sensing unit in FIG. 3 is used. Referring to FIG. 6, the abscissa corresponds to the range of a sensed image (the size of an object surface); and the ordinate, time. Reference numeral 41 in FIG. 6 denotes the range of a sensed image.

Figure 7:
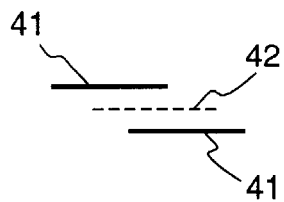
FIG. 7 is a view showing the concept of image interpolation.
Figure 8:
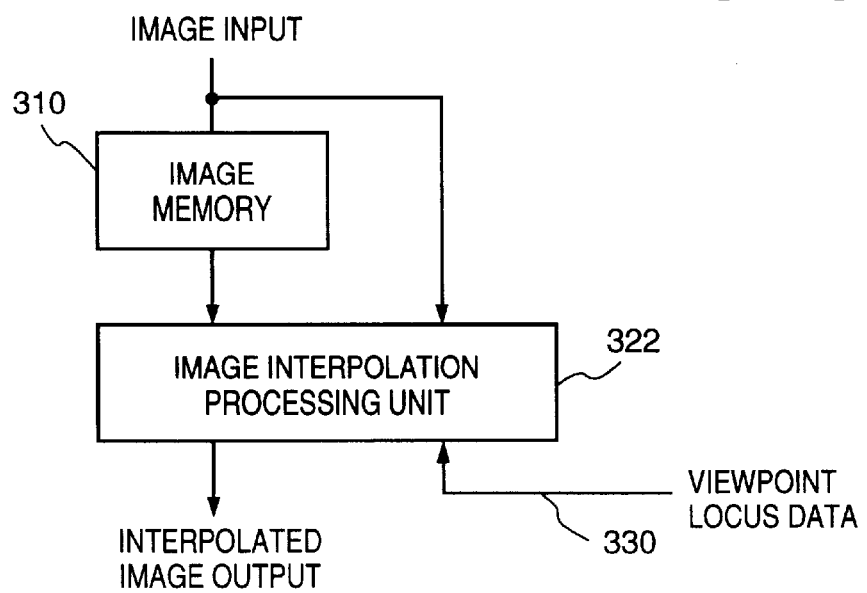
FIG. 8 is a block diagram showing an image interpolation unit.

In this photographing operation, an image 42, i.e., an image viewed from a virtual viewpoint, is interpolated from the time of photography between images 41, as shown in FIG. 7. FIG. 8 shows the concept of this processing.

"Image input" in FIG. 8 is an input through the A/D converter 150 in FIG. 3. Assume that the current time of photography is n. In this case, image data at time n–1 has been input to the image memory 310, and the images at time n and time n–1 are simultaneously input to an image interpolation processing unit 322 constituting part of processing performed by the main processing unit 320 (FIG. 3). That is, the above operation is equivalent to input of a stereo image.

Interpolation processing to be performed by the image interpolation processing unit 322 is executed in synchronism with input of the respective viewpoint coordinates of the viewpoint locus data 330 described above.

As is apparent, the viewpoint locus data 330 can include the above virtual viewpoint positions.

Interpolation processing methods in the image interpolation processing unit 322 will be described next.

The interpolation methods include the following two methods:

(1) a method of extracting information of corresponding points of two or more images, and performing interpolation by using a distance calculated on the basis of trigonometrical survey by using the extraction result and the photographing parameters of the camera; and (2) a method of performing interpolation by using spatio-temporal epipolar plane images.

The method (1) will be described first. In order to extract a pair of corresponding points, for example, a block matching method is used. According to this method, for example, a block enclosing a certain point in a left image is considered, and similarities in a right image corresponding to the image in the block are compared to determine corresponding points. In a correlation method as one of the methods of comparing similarities, the cross-correlation between a pixel value in the image in the block and a pixel value in a image to be retrieved is calculated, and a representative point in the block which exhibits the maximum value is determined as a corresponding point. This relationship is represented by the following equation (1):

$$\sigma(m_R, n_R, m_L, n_L) = \frac{\sum_{i,j} R(m_R - i, n_R - j) \cdot L(m_L + i, n_L + j)}{\sqrt{\sum_{i,j} R^2(m_R - i, n_R - j)} \cdot \sqrt{\sum_{i,j} R^2(m_L + i, n_L + j)}} \quad (1)$$

where σ is the normalized cross-correlation value.

Figure 9:
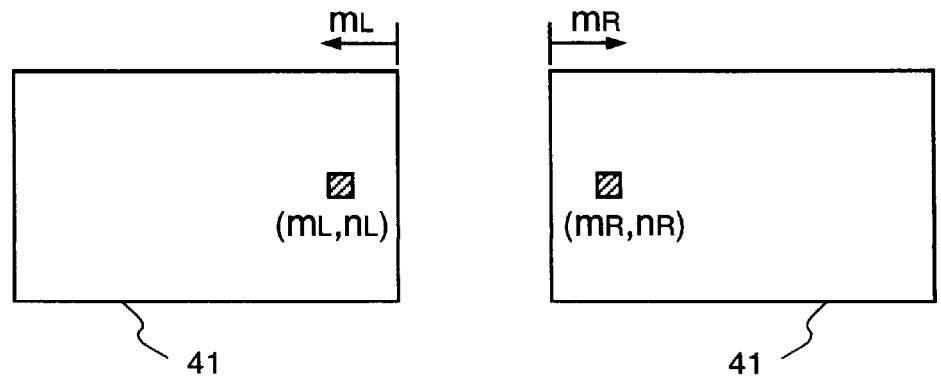
FIG. 9 is a view for explaining corresponding points extraction.

In equation (1), $R(m_R, n_R)$ and $L(m_L, n_L)$ are the pixel values of the left and right images, $\sigma(m_R, n_R, m_L, n_L)$ is the correlation degree, and $(m_R, n_R)$ and $(m_L, n_L)$ are the pixel coordinates in the orthogonal X and Y coordinate spaces. Note that in the square sum or product sum term in equation (1), opposite signs are set before "i" and "j" corresponding to the left and right images because pixel coordinate axes are defined such that the left and right images become symmetrical, as shown in FIG. 9. In normalized cross-correlation in equation (1), the maximum value is 1.

As another interpolation method, an SSDA method is available, which is a kind of block matching.

$$\sigma(m_R, n_R, m_L, n_L) = \sum_i \sum_j |R(m_R - i, n_R - j) - L(m_L + i, n_L + j)| \quad (2)$$

In this method, a residual σ is calculated according to equation (2). If the residual exceeds the certain threshold, which is set in advance, in the process of addition, the calculation is stopped, and then the next combination of $(m_R, n_R)$ and $(m_L, n_L)$ is processed. In general, the threshold is set to the minimum residual in the past.

The positions of the respective corresponding points in the three-dimensional space are obtained from the obtained corresponding point information by the trigonometrical survey method. As shown in FIG. 10, central points $O_L$ and $O_R$ of the object-side major surfaces of the left and right image sensing lens groups $11_L$ and $11_R$ (see FIG. 4) are arranged on the X-axis to be symmetrical about the Z-axis, and the length of a baseline connecting the central points $O_L$ and $O_R$ is represented by b. In this case, the coordinates of the central points OL and OR are respectively represented by (–b/2,0,0) and (b/2,0,0). In addition, when a point P in the three-dimensional space is projected toward the central points $O_L$ and $O_R$, projection points on the left and right CCD sensors $13_L$ and $13_R$ are respectively represented by $P_L$ and $P_R$. The coordinates of the points P, $P_L$, and $P_R$ are respectively represented by (X,Y,Z), ($X_L, Y_L, Z_L$), and ($X_R, Y_R, Z_R$). In this case, a plane defined by the points P, $P_L$, and $P_R$ is called an epipolar plane, and the line of intersection between the epipolar plane and the sensor plane is called an epipolar line.

The coordinates (X,Y,Z) of the point P are given by the following equations:

$$X = (b/2) \cdot \frac{\{X_L + (b/2)\}/Z_L + \{X_R - (b/2)\}/Z_R}{\{X_L + (b/2)\}/Z_L - \{X_R - (b/2)\}/Z_R} \quad (3)$$

$$Y = \frac{Y_R}{Z_R} \cdot Z = \frac{Y_L}{Z_L} \cdot Z \quad (4)$$

$$Z = \frac{b}{X_L + (b/2)\}/Z_L - \{X_R - (b/2)\}/Z_R} \quad (5)$$

Let θ be the angles (convergence angles) defined by the optical axes $L_L$ and $L_R$ of the left and right image sensing lens groups $11_L$ and $11_R$, which pass through the central points $O_L$ and $O_R$ of the object-side major surfaces, respectively, and straight lines parallel to the Z-axis, and f be the focal lengths of the image sensing lens groups $11_L$ and $11_R$, then $$Z_R = \{X_R - (b/2) + f \cdot \sin(\theta)\} \tan(\theta) + f \cdot \cos(\theta)$$

$$Z_L = -\{X_L + (b/2) - f \cdot \sin(\theta)\} \tan(\theta) + f \cdot \cos(\theta)$$

According to the above equations, the coordinates (X,Y,Z) of the point P can be obtained. An image viewed from a certain viewpoint, e.g., an image viewed from an intermediate point O(0,0,0) between the two image sensing systems, is obtained by coordinate transformation processing on the basis of these coordinates.

Figure 11A:
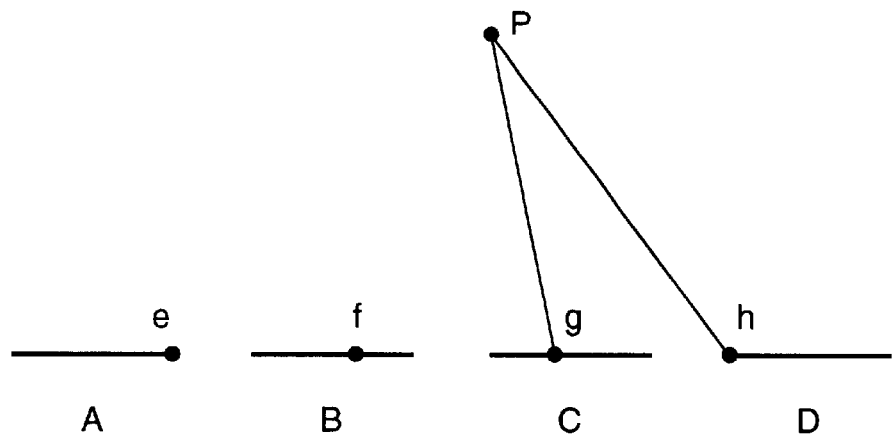
FIGS. 11A and 11B are views for explaining a method of performing interpolation by using spatio-temporal images.
Figure 11B:
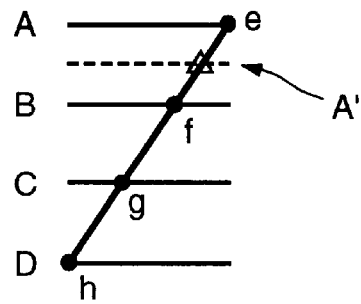

The method (2), which uses a spatio-temporal image, will be described next. As shown in FIG. 11A, a point P is projected onto points e, f, g, and h when the camera is placed at positions A, B, C, and D. These points and positions are arranged vertically, as shown in FIG. 11B. In this case, it seems as if the points P were arranged in a line. Assume that a straight line passes through the points e to h. In this case, if a position A', which is shown by a dotted line, is assumed between the positions A and B, an intersection A becomes an interpolated pixel.

According to this method, an interpolated image is obtained by interpolating a line in epipolar images and substituting the pixel value of a corresponding point for a pixel corresponding to the point of intersection between the line and a detected straight line.

As is apparent, the above problem of corresponding point extraction is replaced with the problem of straight line detection to be solved. In addition, an omission of part of a straight line, i.e., an occlusion portion, can be interpolated by connecting with a straight line.

Figure 12:
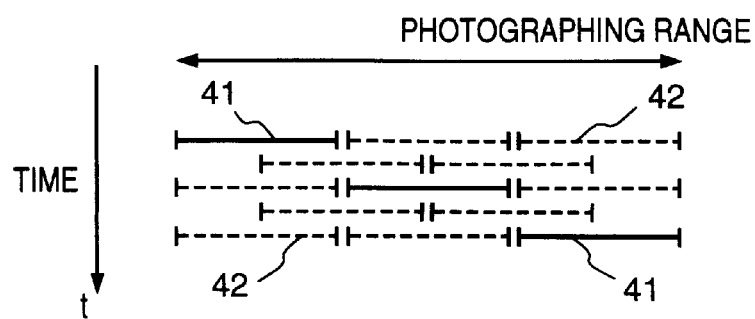
FIG. 12 is a view showing images after interpolation.

By using these method of interpolating an image based on a virtual viewpoint, images 42 which are shown by dotted lines, as shown in, e.g., FIG. 12, can be generated.

The interpolated images are stored in the image memory 2006.

Figure 13:
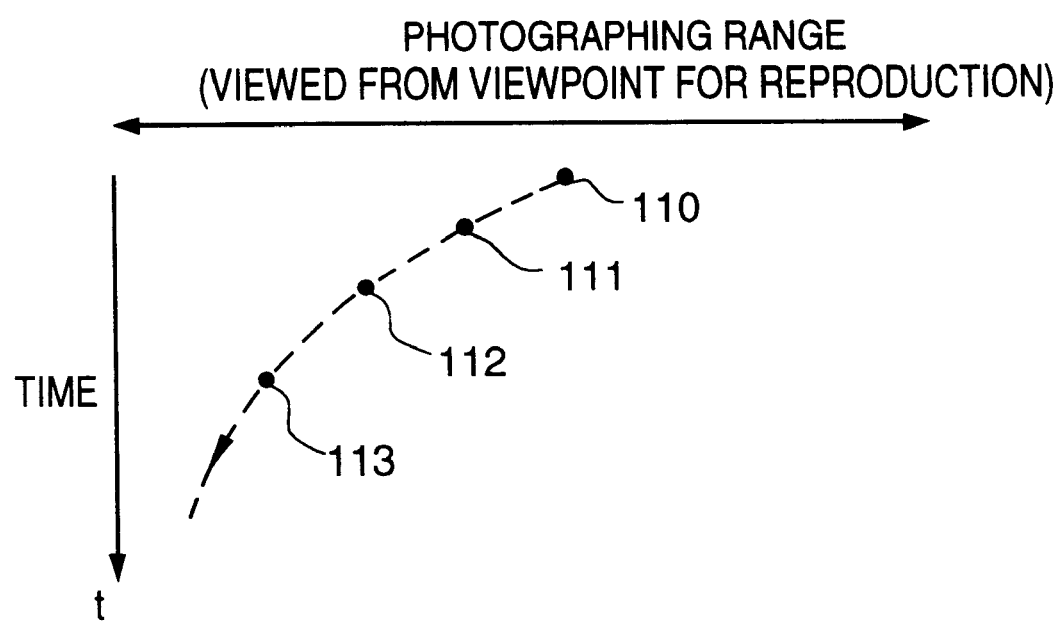
FIG. 13 is a view showing the reproduction order of images.

A method of 330 will be described next with reference to FIG. 13. FIG. 13 shows an image, which is for inputting the viewpoint locus data displayed on the display 2004, for example. In an initial state of the image, the abscissa representing the photographing range and the ordinate representing the time of photography are displayed.

In this case, the user sequentially inputs the central positions (corresponding to virtual viewpoints) of images to be reproduced by using various data input devices connected to the MM I/F 2007.

In the case shown in FIG. 13, when a first point 110 is input, points 111, 112, and 113 are sequentially input. At this time, the dotted line indicated by the points 110, 111, 112, and 113 indicates the reproduction order. These point coordinate data strings are the viewpoint locus data 330 described above.

Referring to FIG. 13, one dotted line is plotted from an upper right position to an upper left position. Also, the line can be arbitrarily drawn in the form of, e.g., a loop or the figure "8". Therefore, the degree of freedom greatly increases in terms of reproduction order as compared with the conventional forward reproduction and backward reproduction.

As described above, interpolated images generated in correspondence with the viewpoint locus data 330 and actually sensed images are sequentially read out from the image memory 2006 and displayed on the display 2004.

Figure 14:
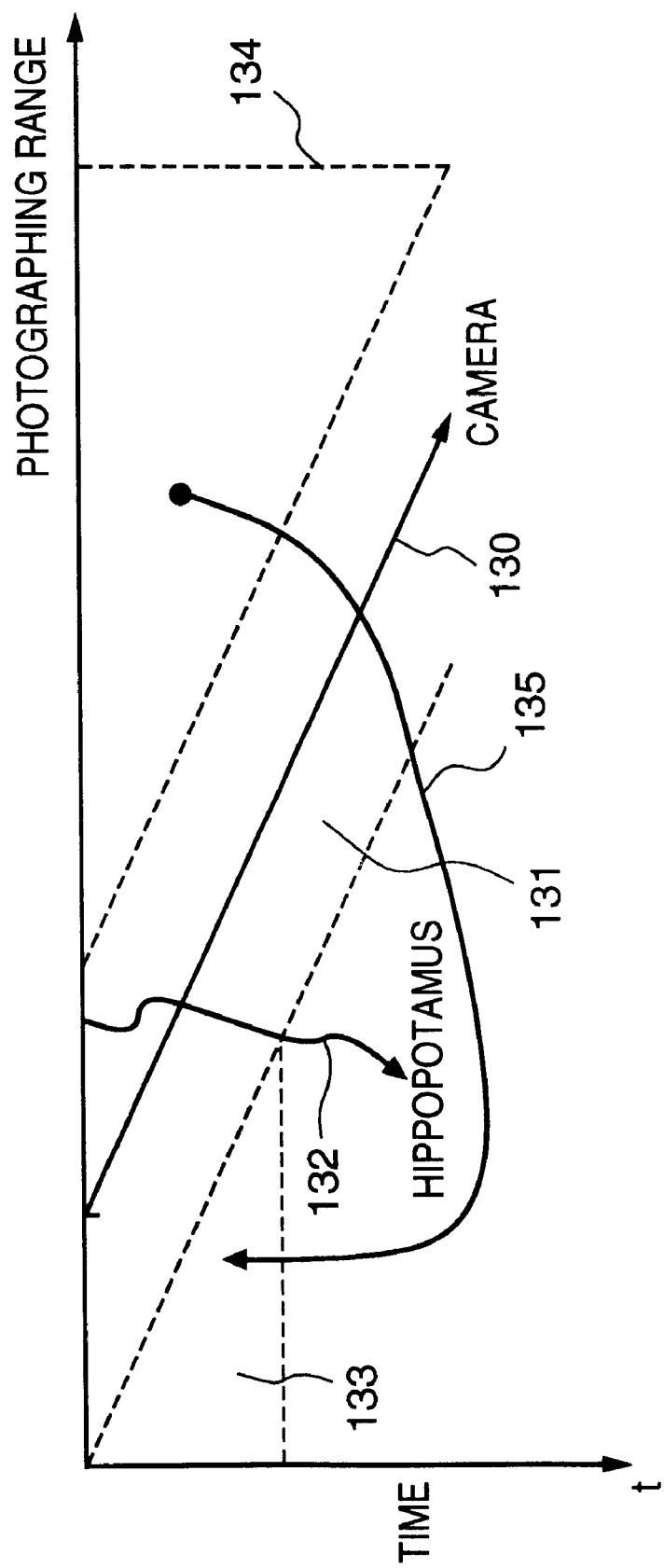
FIG. 14 is a view showing the reproduction order of motion images.

The method of generating an interpolated image when an image is viewed from an arbitrary viewpoint has been described above, together with the method of reproducing generated images in an arbitrary order. A case wherein an object to be photographed is moving will be described next. Assume that the camera moves in the direction indicated by an arrow 130 in FIG. 14. In this case, the image sensing range is an area 131 between the two broken lines. Assume that a hippopotamus as an object to be photographed is moving in the direction indicated by an arrow 132. In this case, areas 133 and 134 in FIG. 14 are respectively an area in which interpolation may be performed as if the hippopotamus was present and an area which can be interpolated as an area where the hippopotamus was not present.

Interpolation processing in this case will be described below. The movement of the camera can be measured with the moving amount calculation unit 220 in FIG. 3 or the like. The movement of the object, i.e., the hippopotamus, is sensed as the sum of the movement of the camera and the movement of the object.

Assume that the object moves slowly like the hippopotamus. In this case, if a photographing operation is performed at the TV field frequency, since the change from a given frame to the next frame is small, the interpolation error is also small. In the above interpolation method using a spatio-temporal image, since an image is interpolated upon detection of a straight line, omissions due to occlusion and the like can be interpolated.

In this case, if a reproduction order 135 is input, an image string can be reproduced in the following order: a background image without the hippopotamus a portion having no image → an image with the hippopotamus moving in different directions. In general, a photographing operation is performed while the camera is picking up an object. That is, a photographing operation is rarely performed in the above manner. In addition, reproduction can be performed in such a manner that the photographed object moves backward or moves forward in various directions, e.g., oblique directions. If, therefore, such a reproduction technique is applied to motion image processing especially in the field of animation, an improvement can be attained in terms of entertainment.

Figure 15:
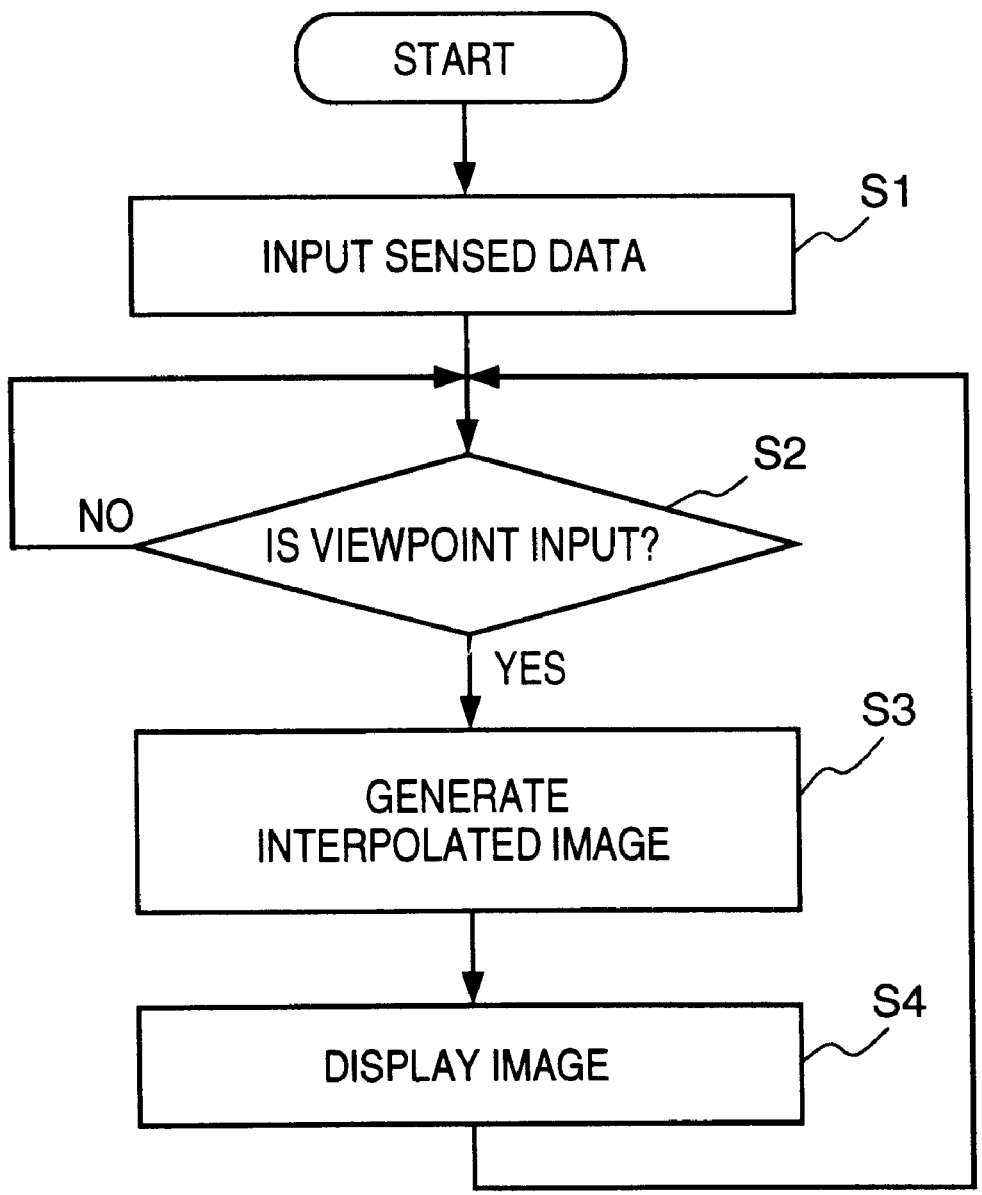
FIG. 15 is a flow chart showing a sequence of image processing in the first embodiment.

The overall image processing in the image processing apparatus of this embodiment will be described next with reference to the flow chart of FIG. 15. Note that the programs corresponding to this flow chart are stored in the ROM 2002 in advance, and are sequentially read out by the MPU 2000 to be interpreted and executed.

In step S1, image data sensed by the image sensing unit 2005 at the respective discrete times are input to the image memory 2006.

In step S2, the flow waits for input of a viewpoint position serving as a request sent from the MM (Man-Machine Interface) I/F 2007 to request display of a reproduced image viewed from a desired viewpoint at a desired time point. If the viewpoint position is input, the flow advances to step S3.

In step S3, an image is interpolated by the method described in detail above on the basis of the viewpoint position input in step S2 and the sensed image data stored in the image memory 2006, and the interpolated image is stored in the image memory 2006.

In step S4, the interpolated image is displayed on the display 2004 through the display I/F 2003 on the basis of the interpolated image generated in step S3. The flow then returns to step S2 to wait for viewpoint data to be input next, and the same processing as described above is repeated.

[Second Embodiment]

Figure 32:
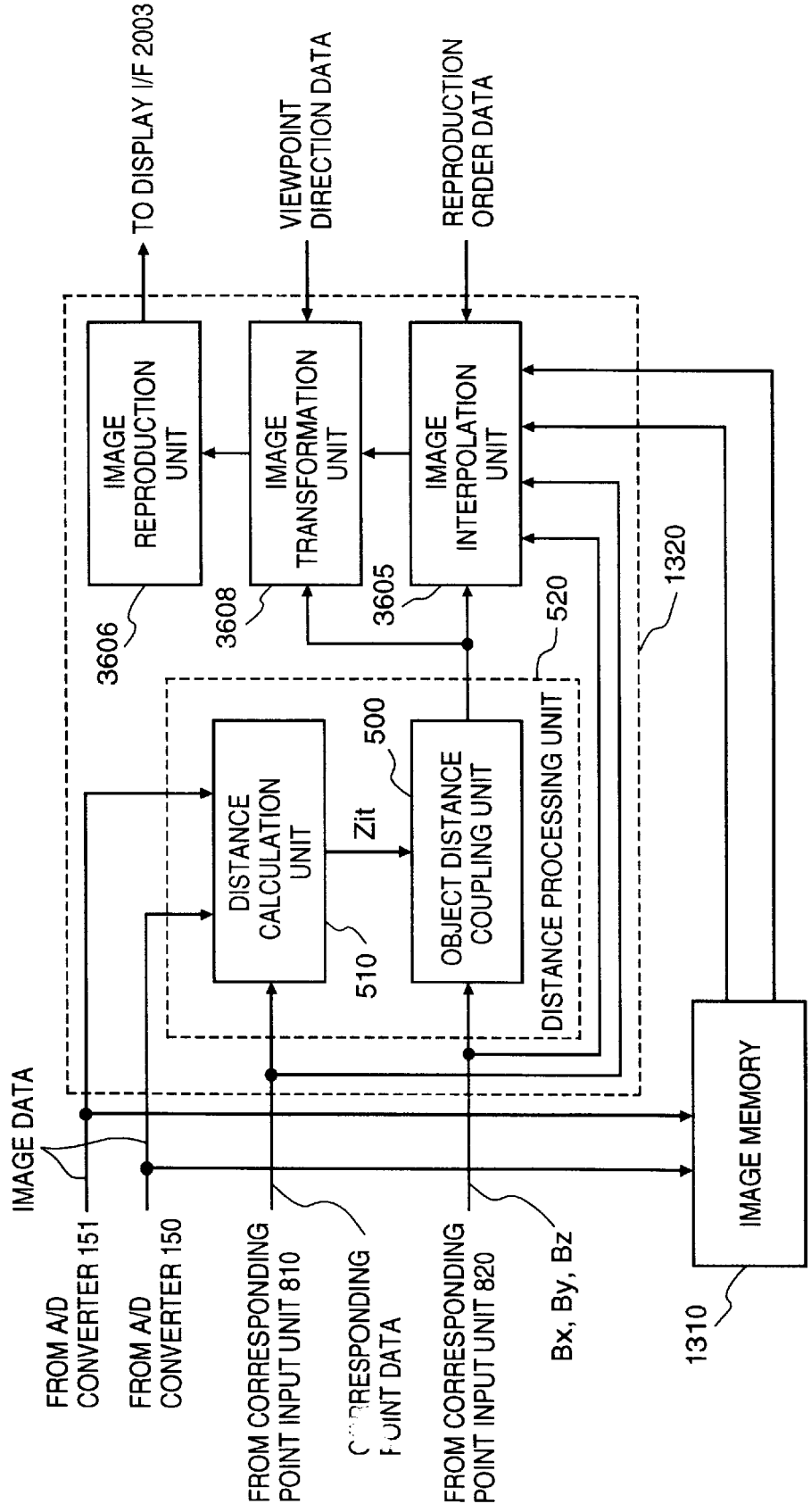
FIG. 32 is a block diagram showing the arrangement of a main processing unit according to the eighth embodiment of the present invention.

The image processing method of the first embodiment has been mainly described with reference to the single-eye image sensing unit (image input unit 100) in FIG. 32.

The image processing method of the second embodiment will be mainly described with reference to a case wherein image data is input by using a multi-eye image sensing unit (FIG. 4).

Figure 16:
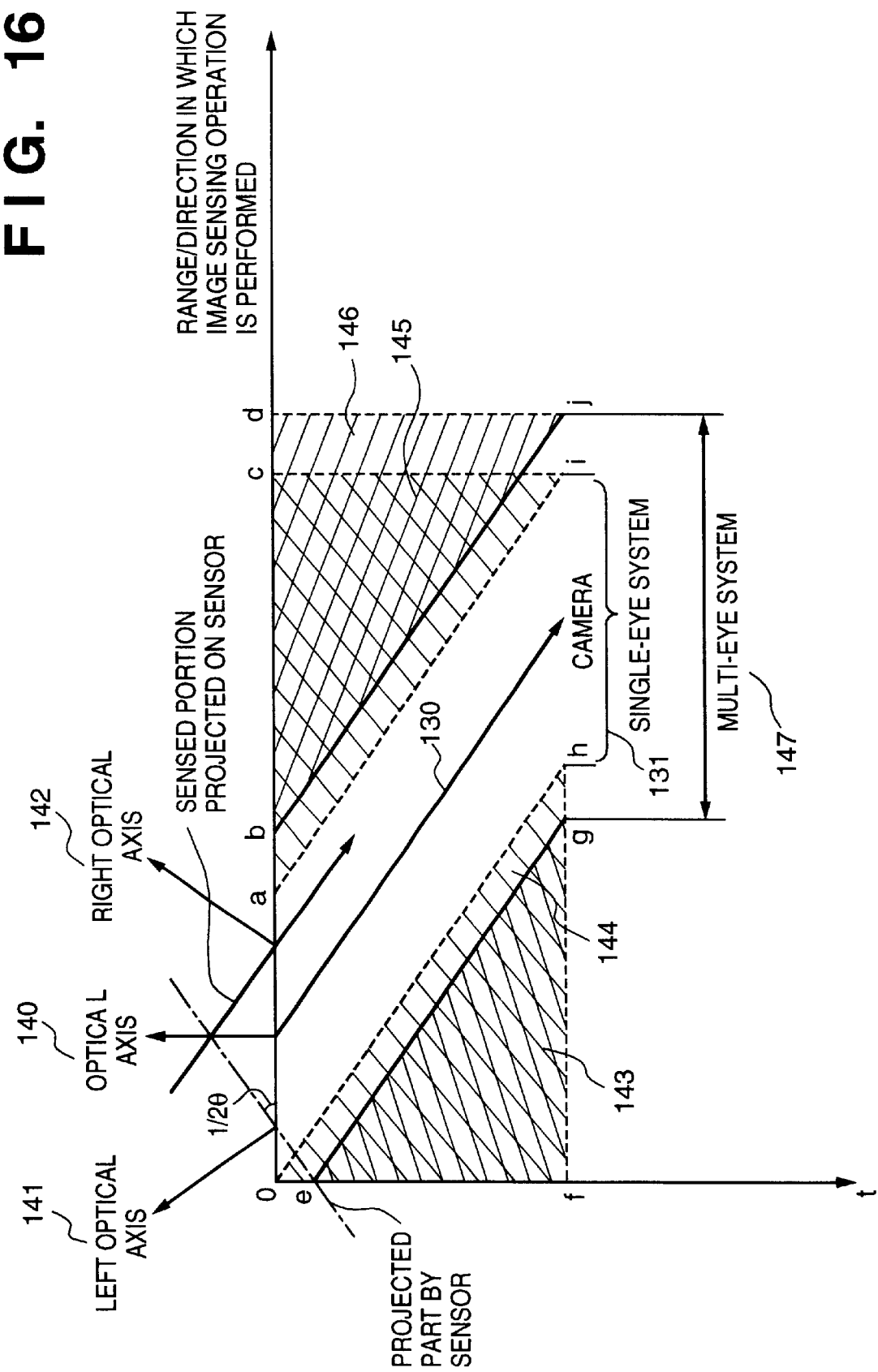
FIG. 16 is a view illustrating interpolation areas when a photographing operation is performed by a multi-eye image sensing unit.

FIG. 16 shows a state wherein a photographing operation is performed at a multi-eye image sensing system convergence angle θ. Reference numeral 140 denotes an optical axis set when a photographing operation is performed by using a single-eye image sensing system; 141 and 142, left and right optical axes set when a photographing operation is performed by using the multi-eye image sensing system; and 130, the locus of a camera in a case wherein a photographing operation is performed by using the single-eye image sensing system. Assume that the multi-eye image sensing system moves along the same locus as the locus 130 of the single-eye image sensing system.

An area Δofh (144) and an area Δaic (145) are interpolation areas when the single-eye image sensing system is used. An area Δefg (143) and an area Δbcd (146) are interpolation areas when the multi-eye image sensing system is used. An interval hi (131) is a photographing range when the single-eye image sensing system is used. An interval gi (147) is a photographing range when the multi-eye image sensing system is used. As is apparent from FIG. 16, the photographing range (147) is larger than that set when the single-eye image sensing system is used. Consequently, the range in which interpolation can be performed is widened. Note that in this case, interpolation and reproduction methods are the same as those in the first embodiment.

[Third Embodiment]

The third embodiment exemplifies the processing method of three-dimensionally displaying an image reproduced by using an interpolated image generated in the first or second embodiment. Assume that in this embodiment, the multi-eye image sensing unit in FIG. 4 is used as an image input means.

Figure 17:
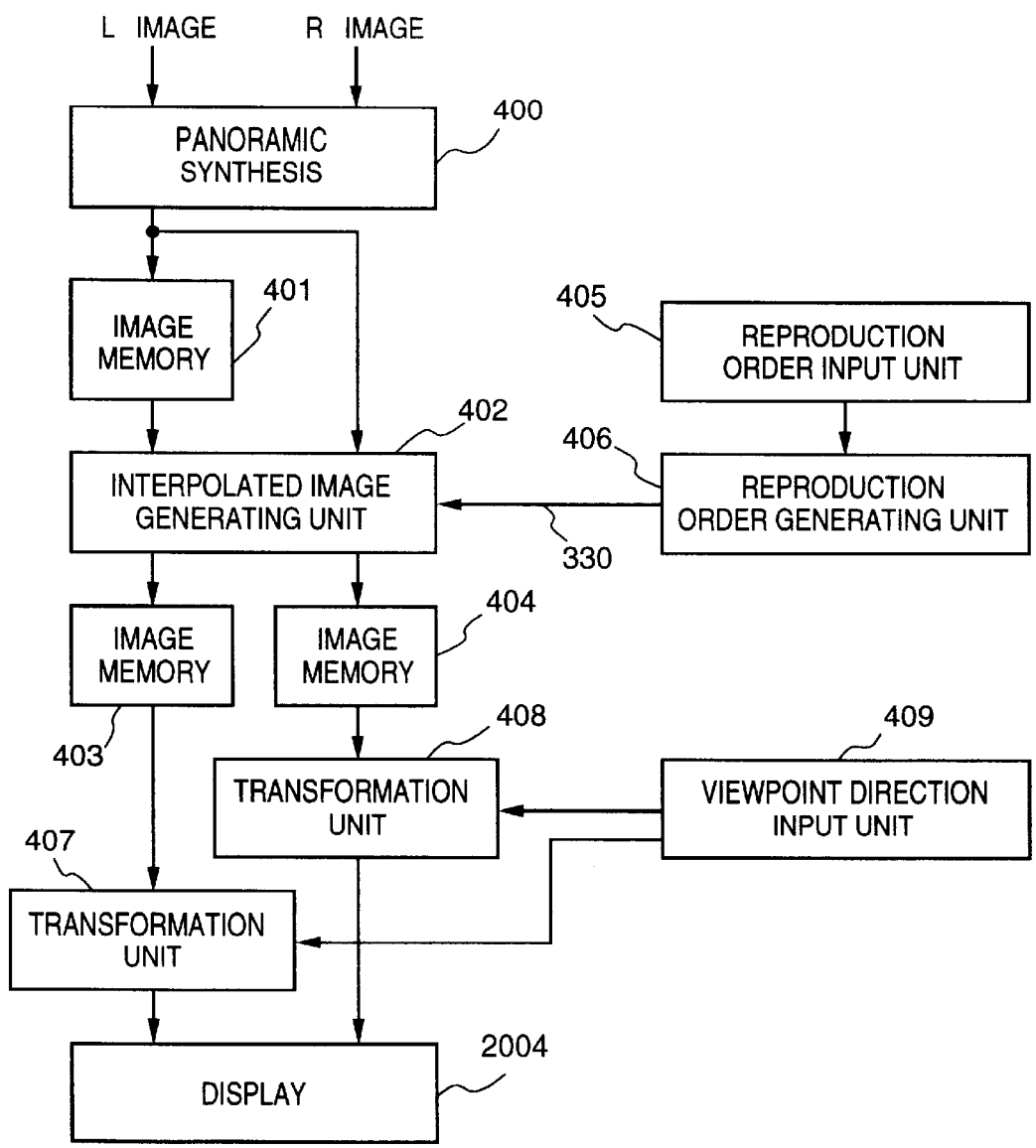
FIG. 17 is a block diagram showing a processing arrangement for reproducing a three-dimensional image at an arbitrary viewpoint in an arbitrary viewpoint direction.

FIG. 17 schematically shows a sequence of reproduction processing. Referring to FIG. 17, two images input from the image sensing unit 2005 at a given time, i.e., an L (left) image and an R (right) image, are subjected to panoramic synthesis in a panoramic synthesizing unit 400. Note that a panoramic synthesis method is disclosed in detail in Japanese Patent Application No. 5-223544 filed by the present applicant on Sep. 8, 1993. This image having undergone panoramic synthesis is stored in an image memory 401, and an interpolated image is generated by an interpolated image generating unit 402 in the same manner as described above. L (left) images and R (right) images are stored in image memory areas 403 and 404 respectively. These image memory areas 401, 403, and 404 are assigned to the image memory 2006.

The interpolated image generating unit 402 performs basically the same processing as that in the image interpolation processing unit 322 described above except that a panoramic image is input.

Data to be input from a reproduction order generating unit 406 is the same as the viewpoint locus data 330. That is, the viewpoint locus data 330 is generated by a reproduction order input unit 405 and the reproduction order generating unit 406. In this case, the reproduction order input unit 405 corresponds to the respective data input devices connected to the MM I/F 2007. The reproduction order generating unit 406 converts the viewpoint position data input through the reproduction order input unit 405 into data in a predetermined internal digital form, generates a corresponding input string, and sequentially outputs the data of the input string to the interpolated image generating unit 402.

The L and R images respectively stored in the image memory areas 403 and 404 are transferred to transformation units 407 and 408.

In synchronism with the timing at which each data of the viewpoint locus data 330 described above is input to the interpolated image generating unit 402, the interpolated image generating unit 402 generates interpolated panoramic stereo images corresponding to the above data from the input panoramic images at time n−1 and time n, i.e., stereo panoramic images, and stores the generated images in the image memory areas 403 and 404.

A viewpoint direction input unit 409 inputs a viewpoint direction corresponding to each designated viewpoint direction input through the reproduction order input unit 405. The transformation units 407 and 408 perform affine transformation of stereo images input from the image memory areas 403 and 404 on the basis of this viewpoint direction.

Figure 18:
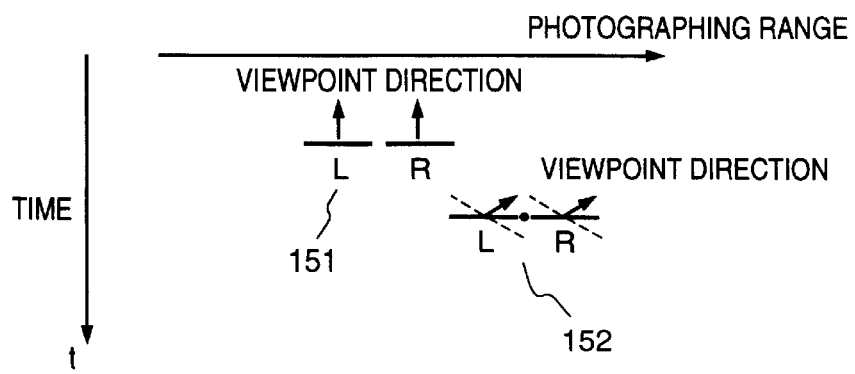
FIG. 18 is a view for explaining a designated viewpoint direction.

FIG. 18 shows an example of how this viewpoint direction data is input. Similar to FIG. 13, the abscissa represents the photographing range; and the ordinate, the time of photography.

This image is displayed on the display 2004. The user can designate and input a viewpoint direction as the direction of an arrow, together with a desired stereo image position (viewpoint) at which the image is to be reproduced, by using the data input devices connected to the MM I/F 2007. This viewpoint direction input processing is performed by the viewpoint direction input unit 409.

Referring to FIG. 17, the processing units other than the image memory areas 401, 403, and 404 and the display 2004 are constituted by software, and the corresponding programs are stored in the ROM 2002 in advance. These programs are sequentially read out, interpreted, and executed by the MPU 2000.

A transformation processing methods in the transformation units 407 and 408 will be described next.

This transformation is realized by calculating the following matrix:

$$\begin{pmatrix} X' \\ Y' \\ Z' \end{pmatrix} = \begin{pmatrix} 1 & 0 & 0 \\ 0 & \cos A & \sin A \\ 0 & -\sin A & \cos A \end{pmatrix} \begin{pmatrix} \cos B & 0 & -\sin B \\ 0 & 1 & 0 \\ \sin B & 0 & \cos B \end{pmatrix} \quad (7)$$

$$\begin{pmatrix} \cos C & \sin C & 0 \\ -\sin C & \cos C & 0 \\ 0 & 0 & 1 \end{pmatrix} \begin{pmatrix} X \\ Y \\ Z \end{pmatrix}$$

where X, Y, and Z are the coordinates of an object point P; A, B, and C are the rotational angles corresponding to viewpoint directions at arbitrary viewpoint positions, and X', Y', and Z' are the coordinates of a point P' to which the object point P has moved in accordance with a change in viewpoint direction.

The transformation units 407 and 408 receive these rotational angles from the viewpoint direction input unit 409, and calculate the coordinates (X,Y,Z) of the respective points of the stereo images input from the image memory areas 403 and 404 according to the expression (7), thereby acquiring the coordinates (X',Y',Z') of the respective points corresponding to the designated viewpoint direction.

The stereo images transformed in this manner are displayed on the display 2004.

As described above, stereo images can be reproduced at arbitrary viewpoint positions, in arbitrary viewpoint directions, and in an arbitrary reproduction order.

[Fourth Embodiment]

Figure 19:
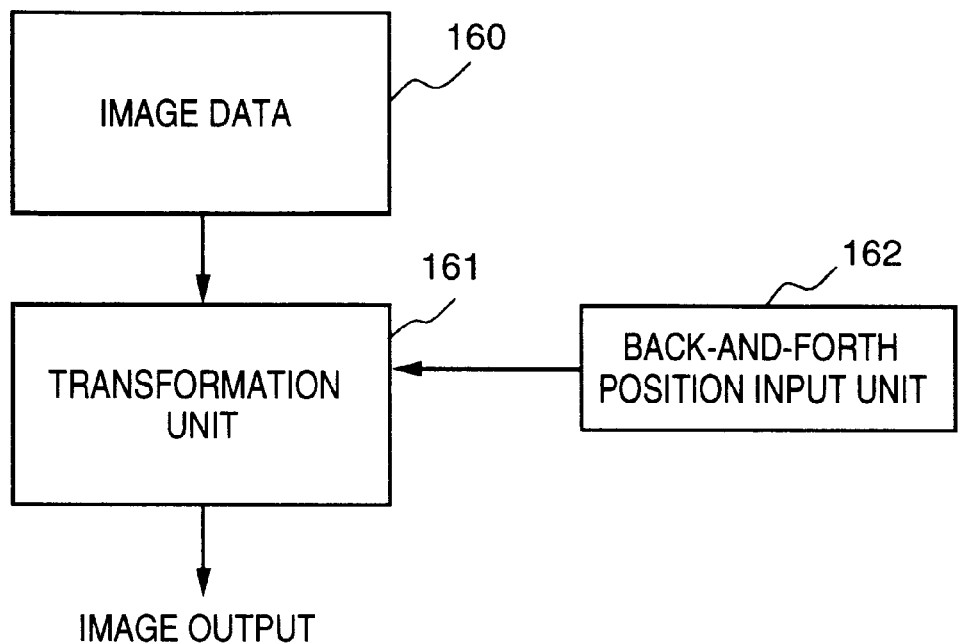
FIG. 19 is a block diagram showing a processing arrangement for performing image reproduction when an image input unit moves back and forth.
Figure 20:
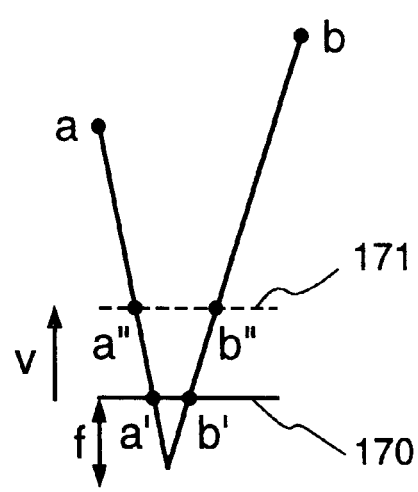
FIG. 20 is a view for explaining processing to be performed when the image input unit moves back and forth.

The fourth embodiment further includes an image transformation unit like the one shown in FIG. 19 to cope with a case wherein a viewpoint moves back and forth. This embodiment uses the following transformation method. As shown in FIG. 20, object points a and b are projected as points a' and b' at the position of an image sensing sensor 170. When the sensor moves to the position of a sensor 171 by a moving amount v, the points a and b are sensed as points a" and b". The points a" and b" can be obtained by simple proportional calculations from a focal length f, the moving amount v, and the coordinates of the points a' and b'.

Referring to FIG. 19, image data 160 are stereo image data having undergone transformation in the transformation units 407 and 408 or stored in the image memory areas 403 and 404. These data are input to a transformation unit 161 to perform image transformation according to the above calculations in accordance with the movement of the viewpoint in the back-and-forth direction.

A back-and-forth position input unit 162 receives the moving amount v from various data input devices connected to the MM I/F 2007, and outputs it to the transformation unit 161.

Note that a sequence (program) of processing in the transformation unit 161 and the back-and-forth position input unit 162 is stored in the ROM 2002 in advance, and is executed by the MPU 2000.

The above image processing method and apparatus of the present invention can be applied to three-dimensional shape measuring devices for obtaining three-dimensional information from two-dimensional images, such as an environmental recognition apparatus, an obstacle recognition apparatus, a geographical shape measuring device, and a remote sensing apparatus, which are mounted in an unmanned traveling vehicle, a self-propelled robot, and the like, and an object or environmental basic shape input device required for a solid model such as a CG or CAD. In addition, a multi- or single-eye image sensing apparatus having a simple three-dimensional measuring device can be applied to an outdoor video recording/reproducing apparatus which is carried by the user, e.g., to d ZOO, to photograph animals and sceneries, and reproduce recorded information on the spot or perform reproduction at home to enjoy images at viewpoints different from those in the recording operation with different effects.

As described above, the above embodiment comprises the image input means, the image storage means, the means for detecting the moving direction and amount of the image input means, the image interpolation means, the image reproduction means, the means for inputting a reproduction order, and the viewpoint position/viewpoint direction input means. With this arrangement, three- or two-dimensional images of still and moving objects viewed from arbitrary viewpoint positions and arbitrary viewpoint directions can be reproduced in an arbitrary reproduction order.

In the above embodiment, an image sensing operation is performed, while the single-eye camera is moved, to form a stereo image. However, in the fifth embodiment, two single-eye cameras are used to acquire a stereo image, and image processing is performed.

[Fifth Embodiment]

Figure 21:
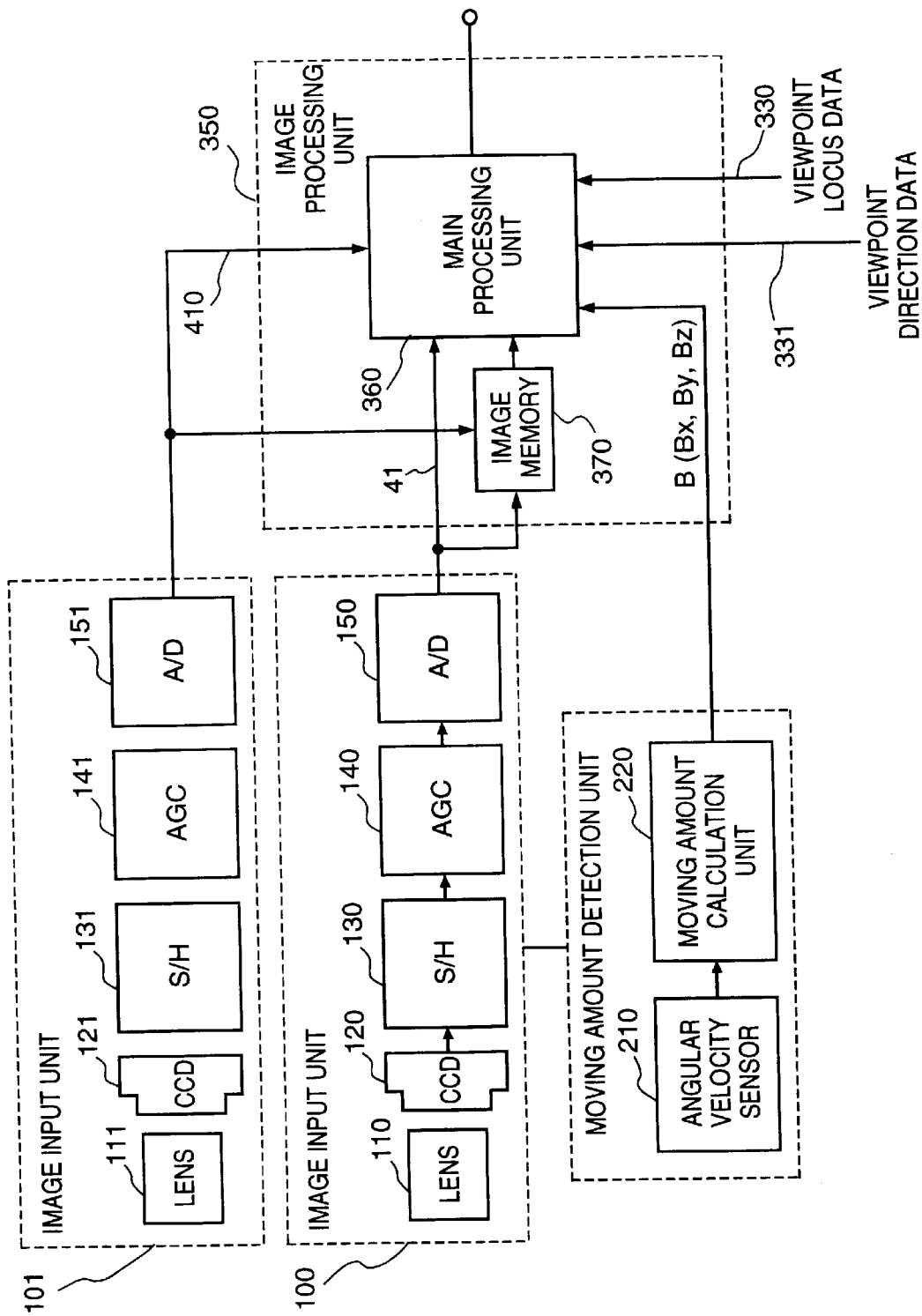
FIG. 21 is a block diagram showing an image processing arrangement using a multi-eye image sensing unit.

FIG. 21 is a block diagram showing the arrangement of a three-dimensional shape measuring device according to the present invention.

The arrangement shown in FIG. 21 is basically obtained by adding an image input unit 101 having the same arrangement as that of the image input unit 100 to the arrangement shown in FIG. 3.

A description of the arrangements of a moving amount detection unit 200 and the image input units 100 and 101 will be omitted, and a different processing unit, i.e., an image processing unit 350, will be mainly described below.

Viewpoint locus data 330 and viewpoint direction data 331 input to a main processing unit 360 are identical to those input to the reproduction order input unit 405 and the viewpoint direction input unit 409 described above with reference to FIG. 17.

An image memory 370 in the image processing unit 350 simultaneously receive image data respectively output from the image input units 100 and 101, and store the data for a predetermined period of time, thereby allowing the main processing unit 360 to perform an operation between a given image and the next image as time series data. A processing unit 320 performs various image processing operations like in the fifth embodiment. For example, the image processing unit 350 (except the image memory 370) is constituted by software, and the corresponding processing programs are stored in the ROM 2002. These programs are executed by the MPU 2000.

Figure 22:
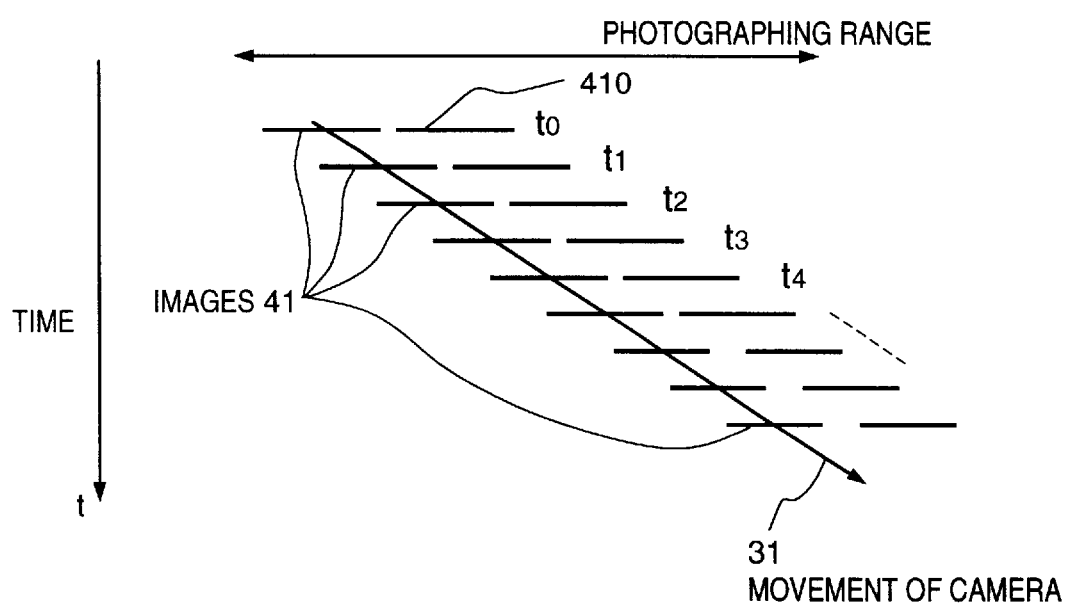
FIG. 22 is a view showing the relationship between the photographing range of images sensed by the image processing arrangement in FIG. 21 and the time.

FIG. 22 shows the photographing range and the time of photography of image data 41 and 410 to be input to the main processing unit 360.

FIG. 22 also shows a state wherein the user holds a unit including the image input units 100 and 101 and the moving amount detection unit 200 with his/her hands in front of a cage in a zoo, and performs a photographing operation while moving in the direction indicated by the arrow 31 in FIG. 5.

Referring to FIG. 22, the abscissa represents the range of sensed images; and the ordinate, the time base. Intervals 41 and 410 in FIG. 22 respectively represent the ranges of images sensed by a multi-eye image sensing unit as in this embodiment.

Assume that the apparatus is moved in the direction indicated by an arrow 31 from time to $t_0$ time $t_1$, and the multi-eye cameras 100 and 101 shift parallel. Also, assume that the moving amount calculated by a moving amount calculation unit 220 is a moving amount Bz. This information is sent to the main processing unit 360. The main processing unit 360 performs processing, e.g., obtaining an object distance $Z_{it1}$.

Image data output from the image memory 370 are stereo images respectively output from the image input units 100 and 101 at time n−1 with respect to the images 41 and 410 at time n. For the sake of easy understanding, FIG. 22 does not show such data.

Figure 23:
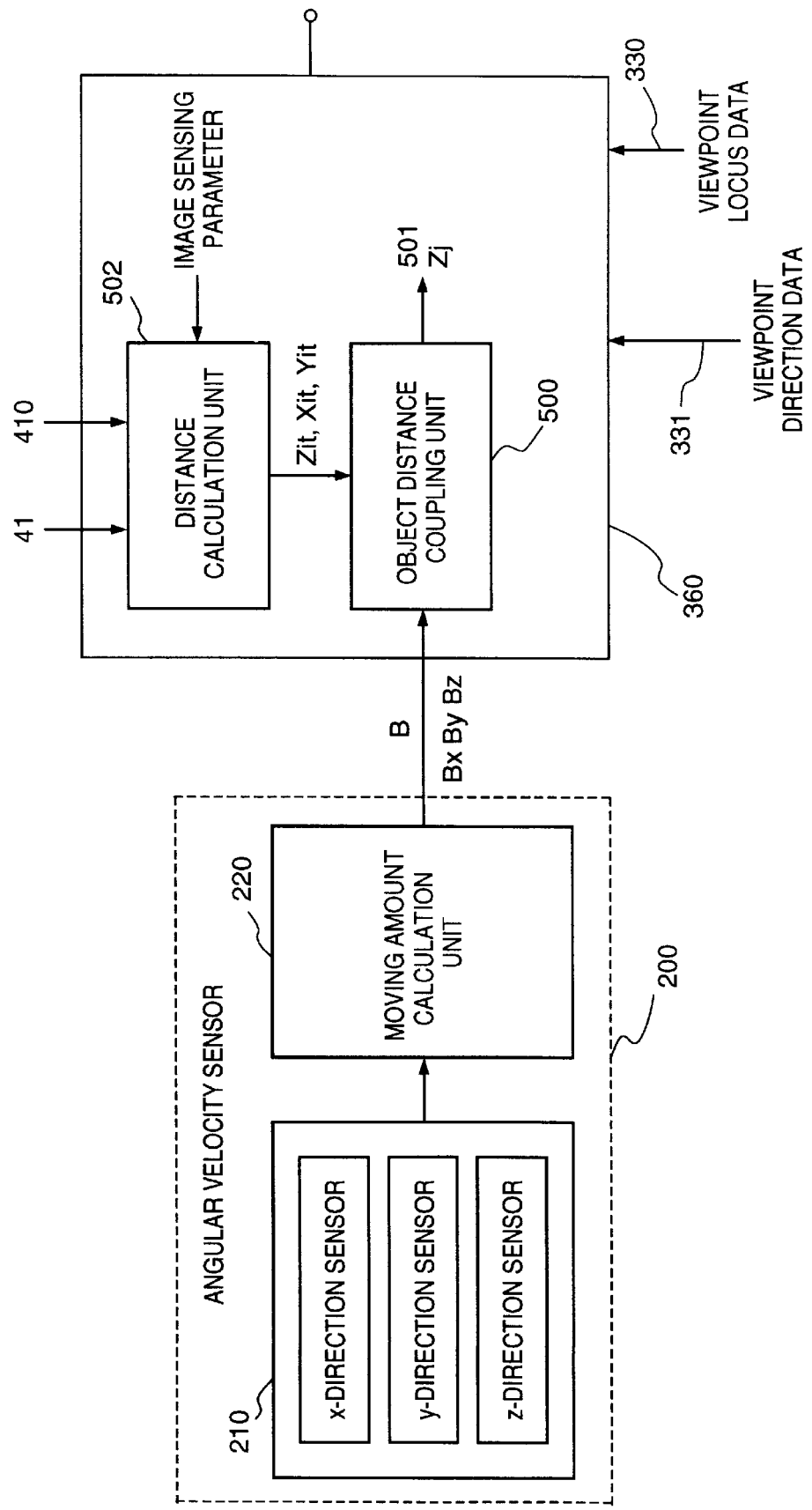
FIG. 23 is a block diagram showing a processing arrangement for extracting distance information of an object to be photographed.

FIG. 23 is a block diagram for explaining the detailed arrangement of part of the main processing unit 360.

Referring to FIG. 23, the above moving amount B or the above moving vector (Bx,By,Bz) are input to an object distance coupling unit 500 of the main processing unit 360.

The object distance coupling unit 500 adds an object distance (depth) $Z_{it1}$ calculated by a distance calculation unit 502 (to be described later) to an output $B_z$ from the moving amount calculation unit 220. Therefore, with reference to the position of each camera at time $t_0$, a calibrated object distance is given by:

$$Z_{it1}'=Z_{it1}+B_z$$

Similarly, Bx and By are added to $X_{it1}$ and $Y_{it1}$ respectively output from the distance calculation unit 502 to obtain calibrated object distances $X_{it1}'$ and $Y_{it1}'$. The number of calibrated object distances obtained in this manner increases with time t, thereby detailed distance data in a wide range can be obtained by performing a photographing operation a plurality of times in the direction indicated by the arrow 31, as shown in FIG. 22. These distance data are sent to an image generating unit 801 (hto be described later).

The contents of processing performed by the distance calculation unit 502 will be described next. The stereo image data 41 and 410 corresponding to discrete times $t_0, t_1, \ldots, t_n$ in FIG. 22 are sequentially input to the distance calculation unit 502, which calculates three-dimensional information corresponding to the input order, and outputs the resultant object distances $X_{it}, Y_{it},$ and $Z_{it}$ described above to the object distance coupling unit 500. In order to acquire three-dimensional information, the distance calculation unit 502 extracts corresponding points between the stereo image data 41 and 410 input at each time. The distance calculation unit 502 obtains the three-dimensional information of the object by using the corresponding points and photographing parameters for the cameras, e.g., focal lengths f and a distance b between the two cameras on the basis of the principle of trigonometrical survey.

This corresponding point extraction method has already been described in the first embodiment, and hence a description thereof will be omitted.

Assume that the obtained corresponding points in the images 41 and 410 which correspond to an object point Pi at time $t_0$ have coordinates $(v_L, h_L)$ and $(v_R, h_R)$. In this case, an object distance $Z_{it0}$ with respect to the object point Pi is given by:

$$Z_{it0} = f \frac{b}{V_L - V_R}$$

where f is the focal length and b is a given baseline length between the two cameras 100 and 101. These values are image sensing parameters.

In this manner, all object distances $Z_i$ are obtained from a plurality of corresponding points obtained from the images 41 and 410.

Note that $$X_{it0} = \frac{Z_{it0} V_L}{f}, Y_{it0} = Z_{it0} \frac{h_L}{f}$$

Figure 24:
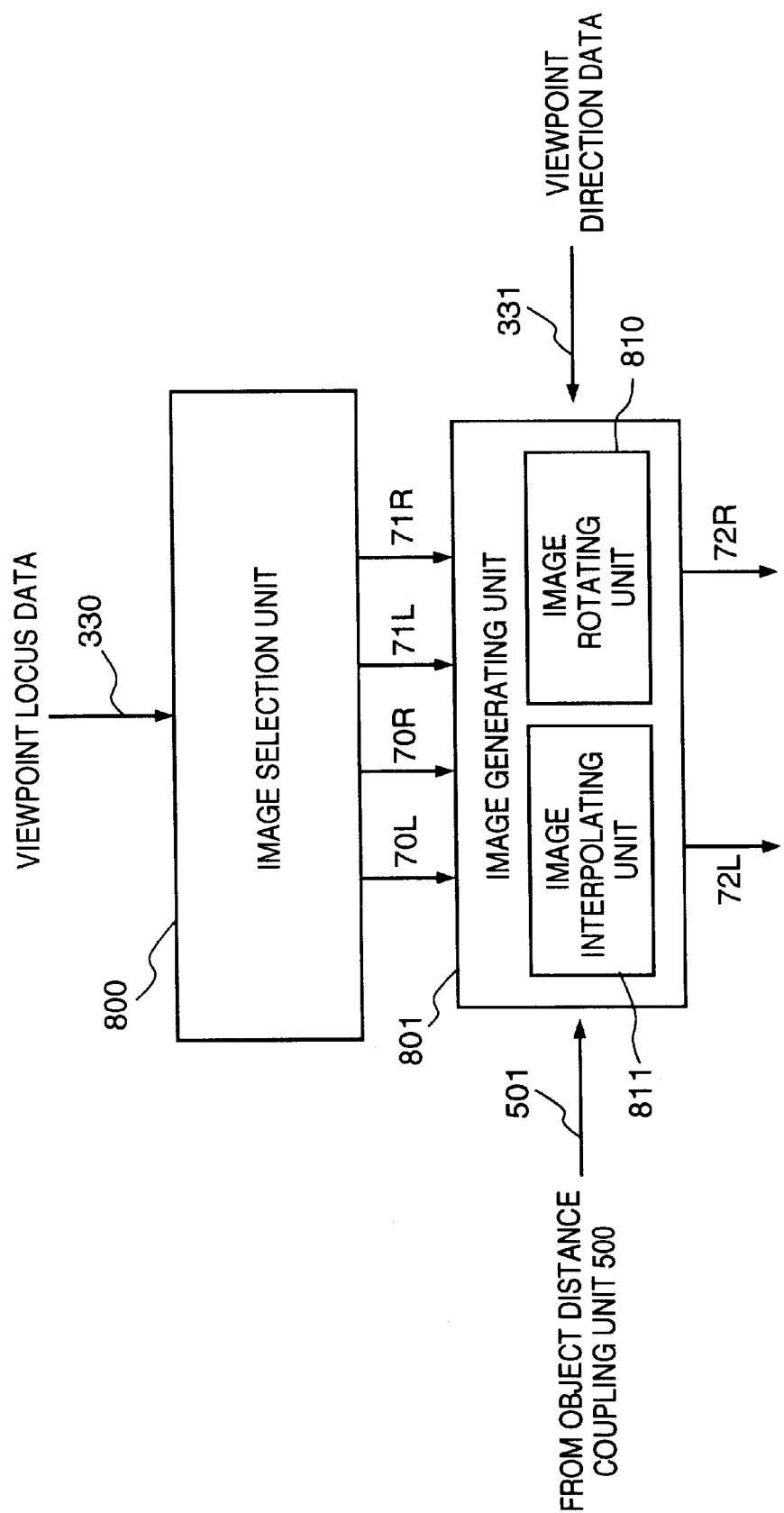
FIG. 24 is a block diagram showing a processing arrangement for generating a reproduced image from designated viewpoint/viewpoint directions in accordance with distance information.

The image processing unit as a characteristic feature of this embodiment will be described next with reference to FIG. 24. FIG. 24 shows the concept of image reproduction processing. The arrangement shown in FIG. 24 constitutes part of the main processing unit 360 (FIG. 21).

Figure 25:
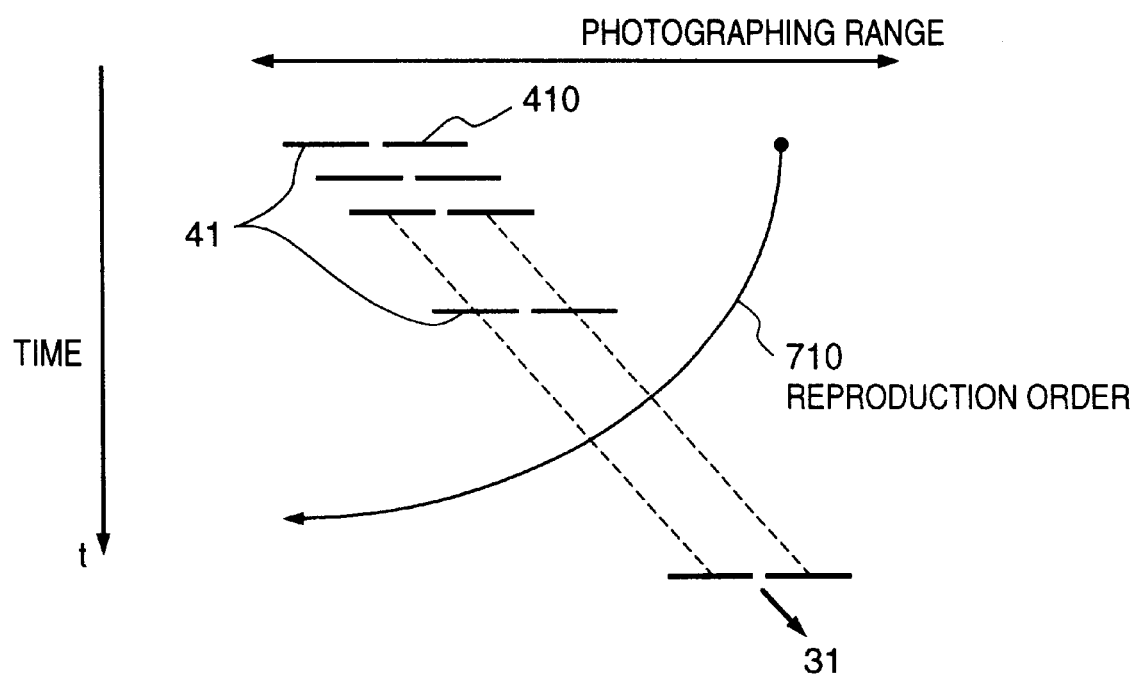
FIG. 25 is a view showing the relationship between photographed images and a designated reproduction order.

Upon reception of one viewpoint position data of the viewpoint locus data 330, an image selection unit 800 selects two pairs of stereo images nearest to the viewpoint position. This operation will be described below with reference to FIG. 25. FIG. 25 shows an image which is for inputting an image reproduction order, displayed on the display 2004 when an image reproduction order is to be input. The photographing range of the stereo imaged data 41 and 410 which have already been sensed are displayed on the display 2004 in correspondence with the time of photography. The user designates a viewpoint string indicating a reproduction order by using various data input devices connected to the MM I/F 2007. The designated viewpoint string data is input, as the viewpoint locus data 330, to the image selection unit 800. The image selection unit 800 selects two pairs of stereo images nearest to each viewpoint of the viewpoint string, and sends first selected stereo images (71L (Left) and 71R (Right)) and second selected stereo images (72L and 72R) to the image generating unit 801.

The image generating unit 801 includes an image interpolating unit 811 as an interpolating means for interpolating the difference between images, and an image rotating unit 810 for rotating an image in accordance with the viewpoint direction data 331.

The image interpolating unit 811 performs interpolation of an image corresponding to a viewpoint designated by the viewpoint locus data 330 on the basis of the two pairs of stereo images (71L and 71R) and (72L and 72R). This interpolation method has already been described above, and hence a description thereof will be omitted. For example, a technique associated with this interpolation is disclosed in Japanese Patent Application No. 6-216323. The image rotating unit 810 then performs rotational transformation of the image obtained by the interpolation in accordance with a viewpoint direction designated by the viewpoint direction data 331.

For this rotational transformation, a calculation may be performed in accordance with matrix (7), as described above.

The stereo images (72L and 72R) having undergone rotational transformation are stored in the image memory 2006, and are displayed on the display 2004 through the display I/F 2003.

As described above, according to this embodiment, not only images actually sensed in a photographing operation can be reproduced, but also images can be sequentially reproduced as images viewed from an arbitrary direction in accordance with a designated reproduction order.

In addition, since designated images are sequentially interpolated in accordance with distance information in a designated reproduction order, a large storage capacity is not required.

A state of processing to be performed until images are output in the above designated reproduction order will be described with reference to FIG. 26.

Figure 26A:
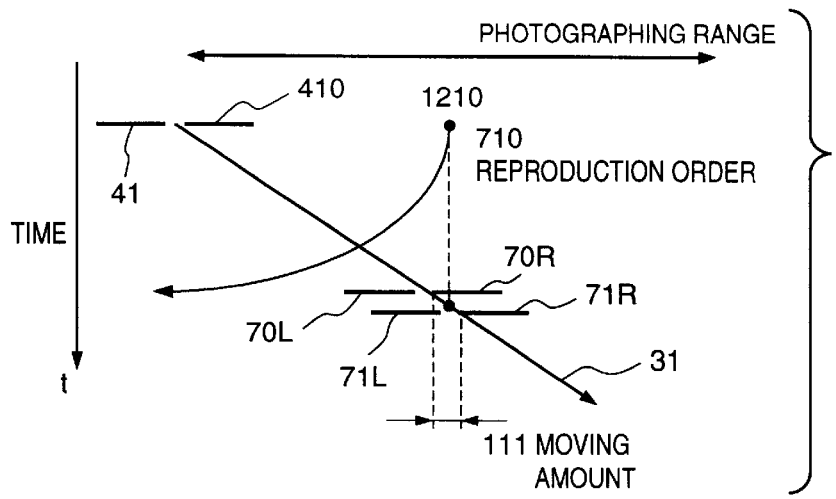
FIG. 26 is a view for explaining processing to be performed until images are reproduced in accordance with a designated reproduction order.
Figure 26B:
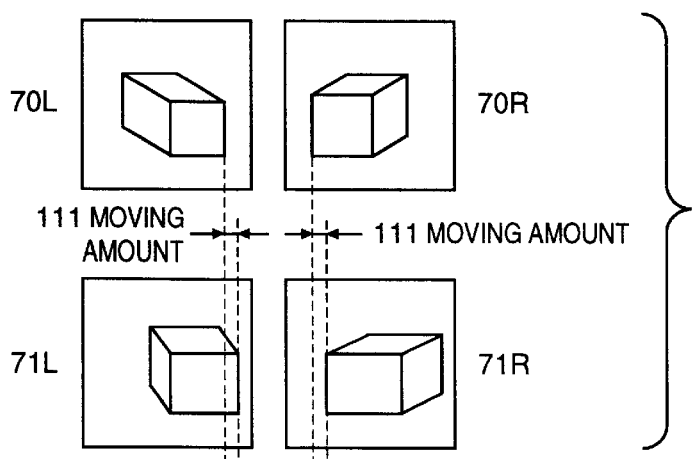
Figure 26C:
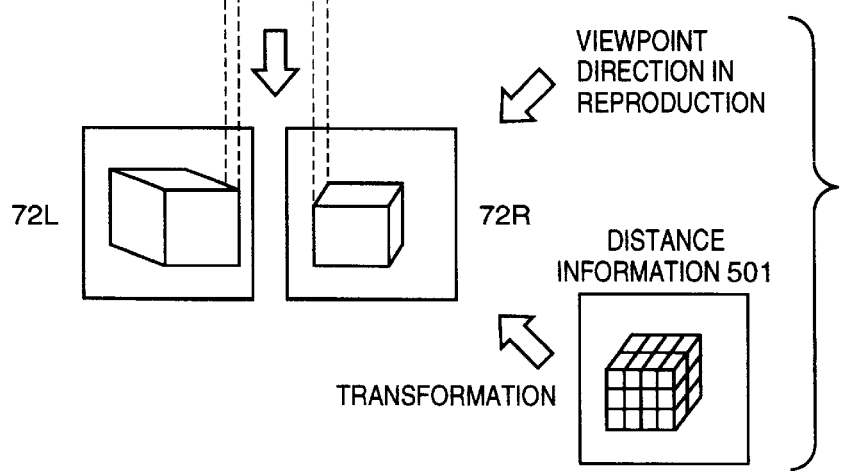
Figure 27A:
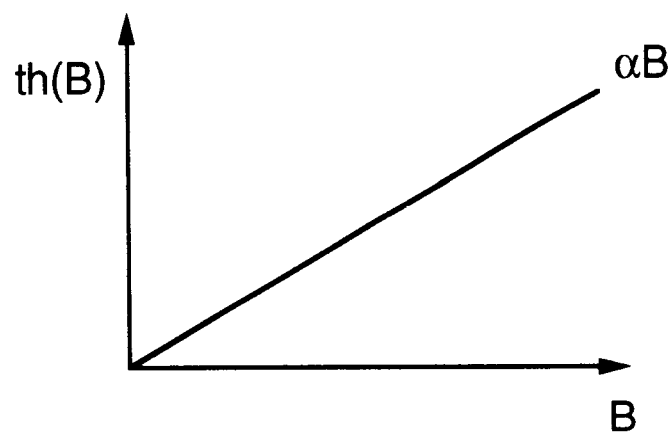
FIGS. 27A and 27B are views showing the relationship between the threshold for determining identical points and the moving amount.
Figure 27B:
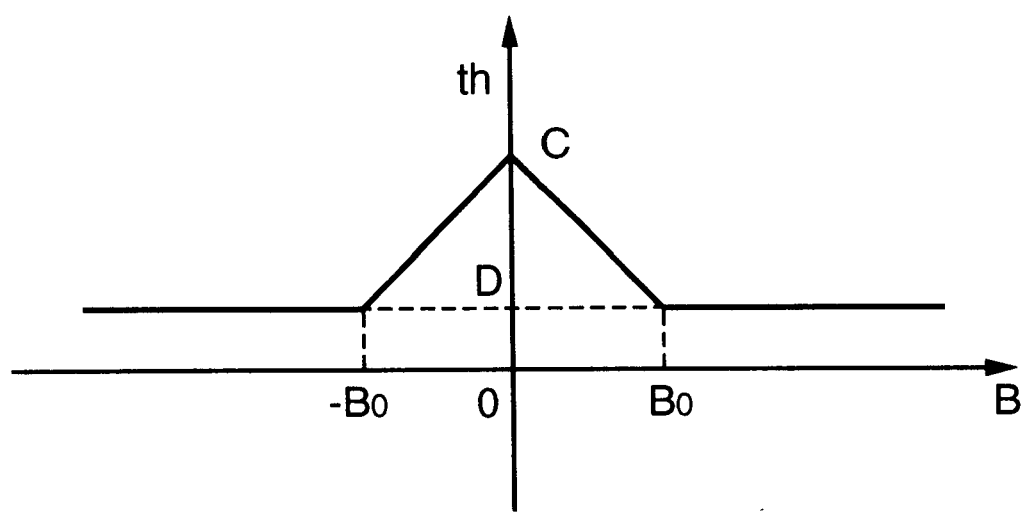

FIG. 26 explains processing to be performed to reproduce corresponding images in accordance with a designed reproduction order 710.

First of all, as indicated by "F26A" in FIG. 26, the images 41 and 410 are sequentially input and stored in the image memory 2006 in accordance with a movement 31 in a photographing operation. The reproduction order 710 is then input, as described above.

As reproduced images at a point 1210 in the reproduction order 710, images 70L, 70R, 71L, and 71R on both sides of an intersection between the movement 31 and a vertical line extending from the point 1210 are selected. The selected images are indicated by "F26B" in FIG. 26. The images 70L and 70R are viewed from the two sides of a cube as an object to be photographed. The images 71L and 71R are viewed from a position shifted to the right from the images 70L and 70R by a moving amount 111.

Images at the above point of intersection are interpolated from these four images 70L, 70R, 71L, and 71R, and are transformed into images viewed from the viewpoint by using distance information. As a result, images 72L and 72R are generated ("F26C"). These two images are displayed on the display 2004, for example, such as an HMD (Head-Mounted Display).

[Sixth Embodiment]

The sixth embodiment exemplifies the corresponding point extraction method which attains a higher accuracy than the corresponding point extraction method in the first embodiment by also taking the correspondence between images in the time base direction into consideration.

First of all, the above-described block matching is performed between left and right images as stereo images sensed at time to, and the obtained corresponding points are expressed as:

($X_{it0}$, $Y_{it0}$, $Z_{it0}$): (i=1, 2, . . . , n; corresponding point number)

The corresponding points obtained by block matching at time $t_1$ are expressed as:

($X_{kt1}$, $Y_{kt1}$, $Z_{kt1}$): (k=1, 2, . . . , n; corresponding point number)

In this case, an evaluation value E representing the similarity between corresponding points of the point numbers i and k is calculated according to the following equation:

$$E=\{X_{it0}-(X_{kt1}+B_x)\}^2+\{Y_{it0}-(Y_{kt1}+B_y)\}^2+\{Z_{it0}-(Z_{kt1}+B_z))\}^2 \ldots (8)$$

In this case, the points ($X_{it0}$, $Y_{it0}$,,, $Z_{it0}$) and ($X_{kt0}$, $Y_{kt1}$,$Z_{kt1}$) which satisfy E<th(B) are considered as identical points. At this time, this threshold th(B) is changed in accordance with, e.g., a moving amount B.

More specifically, when the moving amount B (= $\sqrt{Bx^2+By^2+Bz^2}$) is small, the threshold th(B) is set to be a small value. For example, th=α·B (α is a positive coefficient) (FIG. 8A).

If the moving amount B is large, the threshold th(B) is set to be large. By determining the threshold th(B) adaptively in this manner, identical point determination can be accurately performed.

If the moving amount B and the like can be detected at a high resolution, the following equation can be established, as shown in FIG. 8B:

$$th = \begin{cases} D & B \geq B_0 \\ C - \beta_B & 0 \leq B < B_0 \\ C + \beta_B & -B_0 < B < 0 \\ D & B \leq -B_0 \end{cases} \quad (8)$$

Note that D=C−β$B_0$ and β is a predetermined coefficient.

With this operation, when a photographing operation is performed from a near place, identical point determination is performed relatively loosely, whereas when a photographing operation is performed from a distant place, identical point determination is performed strictly.

The above description is associated with the images sensed at times $t_0$ and $t_1$. As is apparent, however, the same identical point determination processing as described above is performed with respect to images at times $t_n$ and $t_{n+1}$ (n=0, 1, . . . , m).

As described above, in addition to distance information obtained from corresponding points of left and right images, the distance information of the corresponding object point P to be sensed can be obtained by using corresponding points in the time base direction which are obtained in this embodiment. Therefore, the accuracy of the distance information of the object point P can be increased.

[Seventh Embodiment]

In the seventh embodiment, a method of obtaining distance information on the basis of the relationship between a moving amount B and a baseline length b to further increase the accuracy of distance information associated with corresponding points will be described with reference to FIGS. 28A, 28B, and 29.

Figure 28A:
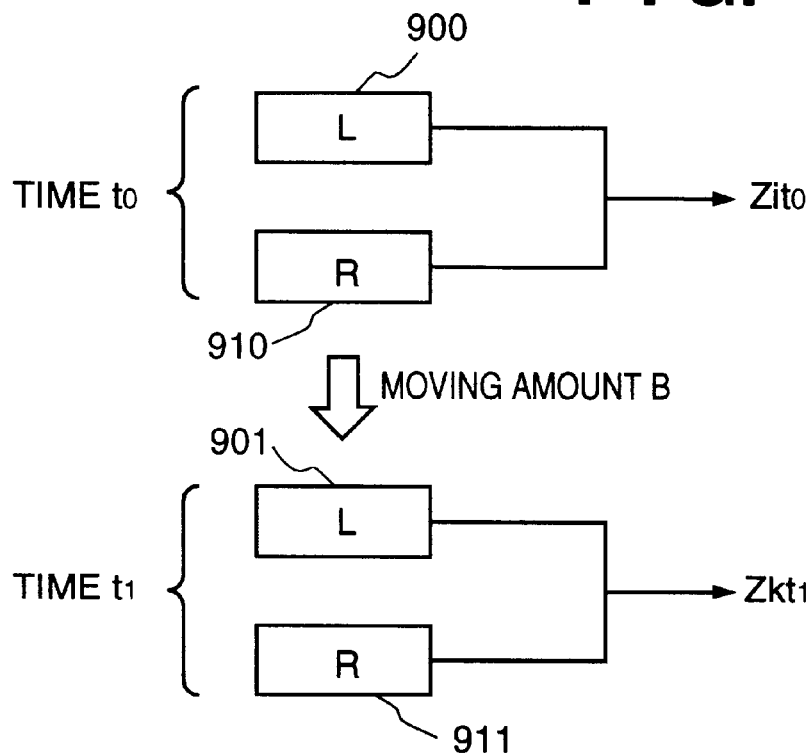
FIGS. 28A and 28B are views for explaining processing for obtaining distance information.
Figure 28B:
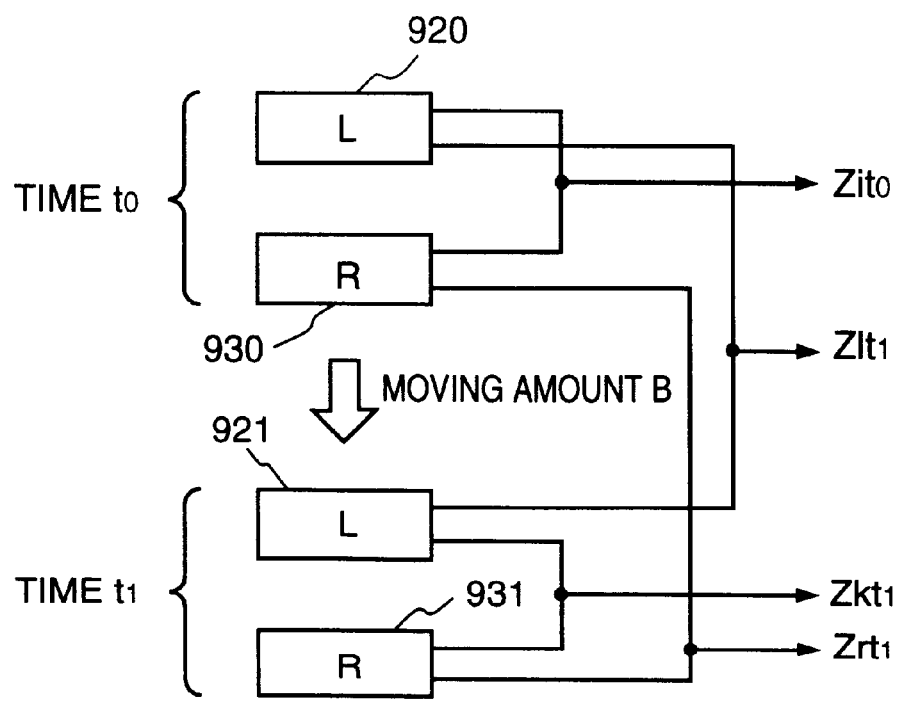

The processing in this embodiment will be briefly described first with reference to FIGS. 28A and 28B.

As shown in FIG. 28A, distance information $Z_{it0}$ (i=0, 1, . . . , n; corresponding point number) from two images L900 and R910 sensed at time to on the basis of the above block matching and trigonometrical survey. Distance information $Z_{kt1}$ (k=0, 1, . . . n; corresponding point number) is then obtained from two images L901 and R911 sensed at time $t_1$. The sixth embodiment exemplifies the method of obtaining corresponding points between images in the time base direction on the basis of the pieces of distance information $Z_{it0}$ and $Z_{kt0}$ obtained at two times $t_0$ and $t_1$. In contrast to this, in the seventh embodiment, as shown in FIG. 28B, $Z_{lt1}$ and $Z_{rt1}$ are sequentially obtained respectively regarding left images at times to and $t_1$ and right images at times $t_0$ and $t_1$. This procedure is explained below. First of all, $Z_{it0}$ is obtained from two images L920 and R930 sensed at time $t_0$. Distance information $Z_{kt1}$ is then obtained from two images L921 and R931 sensed at time $t_1$. In addition to the two distance information $Z_{it0}$ and $Z_{kt0}$ obtained in this order, distance information $Z_{lt1}$ is obtained from the images L920 and L921 respectively sensed at times $t_0$ and $t_1$, and distance information $Z_{rt1}$ is obtained from the images R930 and R931 respectively sensed at times $t_0$ and $t_1$.

In this case, $Z_{lt1}$ and $Z_{rt1}$ are obtained from information obtained when the same image sensing apparatus moves by the moving amount B.

Figure 29:
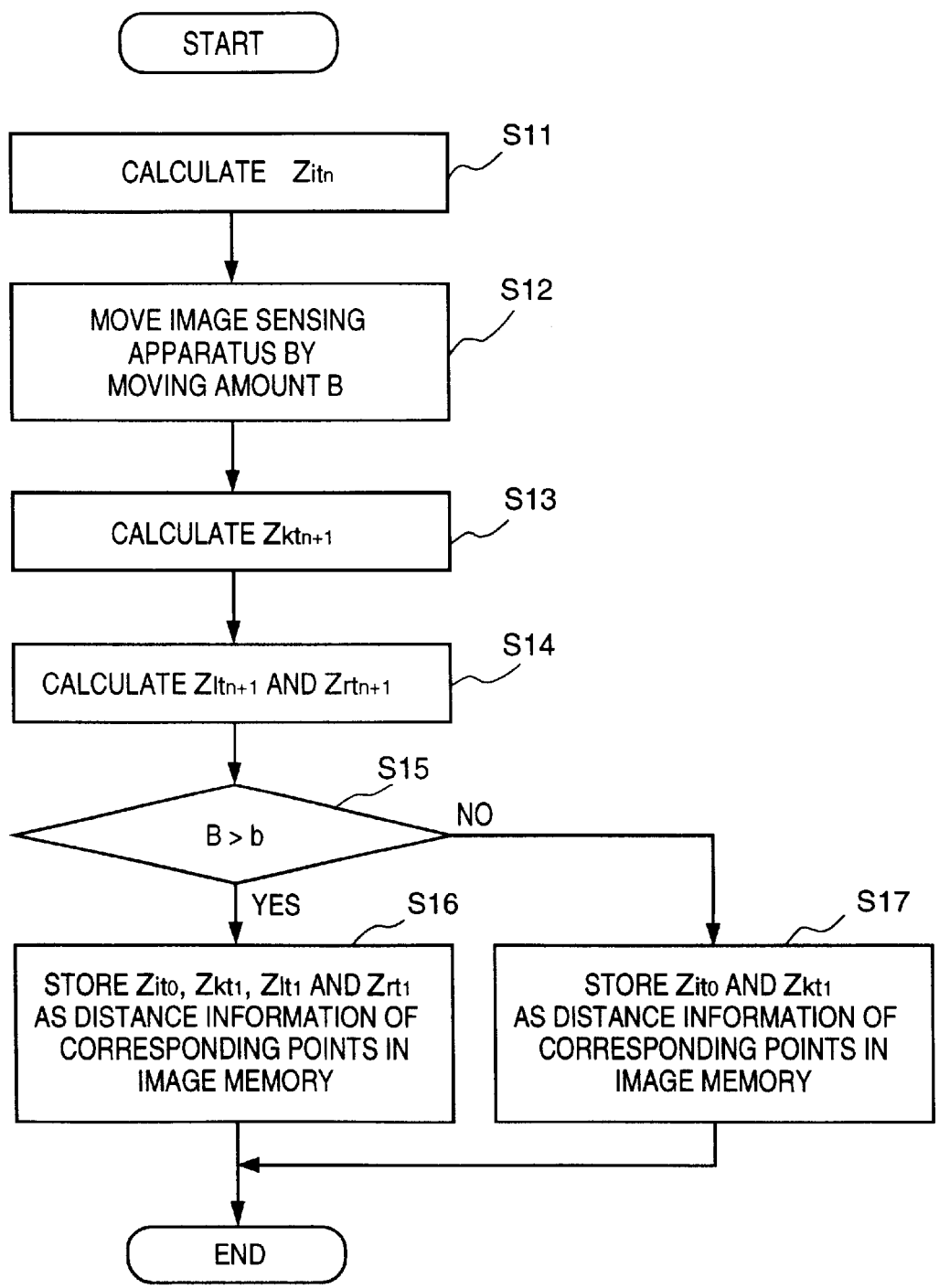
FIG. 29 is a flow chart showing a sequence of processing of generating/synthesizing distance information.

FIG. 29 is a flow chart showing the process of generating/synthesizing these pieces of distance information.

In step S11, a distance $Z_{it0}$ at the ith corresponding point is calculated on the basis of left and right images 920 and 930 respectively sensed at time $t_0$. In step S12, the image sensing apparatuses (100 and 101) are moved by the moving amount B, and left and right images 921 and 931 are sensed. Similar to step S11, in step S13, a distance $Z_{kt1}$ at the kth corresponding point is calculated. In step S14, distances $Z_{lt1}$ and $Z_{rt1}$ at the corresponding points are obtained on the basis of the calculation results in steps S11 and S12 and equation (8).

In step S15, it is checked whether the moving amount B output from a moving amount calculation unit 220 is smaller than the baseline length b of the multi-eye camera. If the moving amount B is smaller than the baseline length b, the flow advances to step S17 to store the distances $Z_{it0}$ and $Z_{kt1}$ as the distance information of the corresponding points in the image memory 2006 without considering the distances $Z_{lt1}$ and $Z_{rt1}$. If the moving amount B is larger than the baseline length b, the flow advances to step S17 to store the four distance information $Z_{it0}$, $Z_{kt1}$, $Z_{lt1}$, and $Z_{rt1}$ as the distance information of the corresponding points in the image memory 2006.

The processing of the images at times $t_0$ and $t_1$ has been described above with reference to the flow chart of FIG. 29. As is apparent, however, images at times $t_n$ and $t_{n+1}$ are processed in the same manner as described above.

As described above, according to this embodiment, the distance information of an object to be photographed which is required to interpolate an image at an arbitrary viewpoint position in an arbitrary viewpoint direction can be extracted at a high resolution. Therefore, high-resolution interpolation/reproduction can be performed.

[Eighth Embodiment]

According to the eight embodiment, there is provided an image processing method and apparatus which include an input means for designating/inputting a plurality of corresponding points with respect to sensed stereo images and in which representative movement vectors for an image input unit are obtained on the basis of a plurality of corresponding input points, and interpolated images are generated by using the representative movement vectors and displayed.

In this embodiment, since accurate representative movement vectors can be obtained, image reproduction can be performed at a higher resolution.

Figure 30:
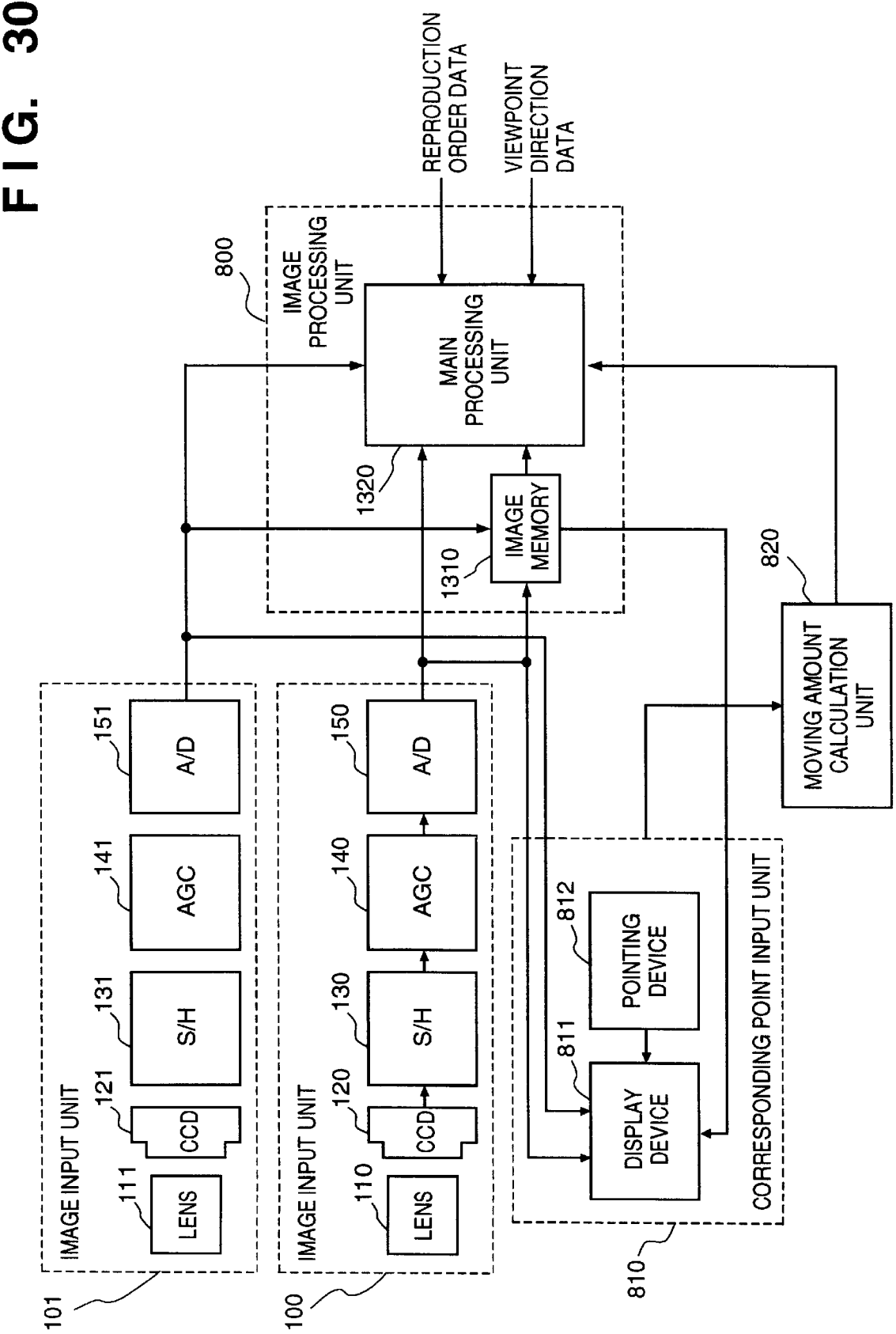
FIG. 30 is a block diagram showing an image processing arrangement having a multi-eye image sensing unit and a corresponding points input unit.

Referring to FIG. 30, blocks 100 and 101 indicated by the broken lines are image input units for sensing an object to be measured to obtain image data. Since the above blocks 100 and 101 are identical to those in FIG. 21, the same reference numerals in FIG. 30 denote the same parts as in FIG. 21.

Stereo images sensed by the image input units 100 and 101 are input to an image processing unit 800. The image selection unit 800 performs interpolation processing of images and the like on the basis of corresponding points input from an image rotating unit 810, which is a characteristic feature of this embodiment, the moving amounts/directions (i.e., movement vectors) input from a moving amount calculation unit 820, reproduction order data, and viewpoint direction data.

The corresponding point input unit 810 includes a display device 811 and a pointing device 812. The display device 811 displays the stereo images input from the image input units 100 and 101. The pointing device 812 is used to input data for designating the positions of corresponding points on the stereo images displayed on the display device 811. Upon reception of this position designation data, the display device 811 displays a predetermined mark at each corresponding displayed image position. The input corresponding point position designation data is sent to the moving amount calculation unit 820.

Figure 31:
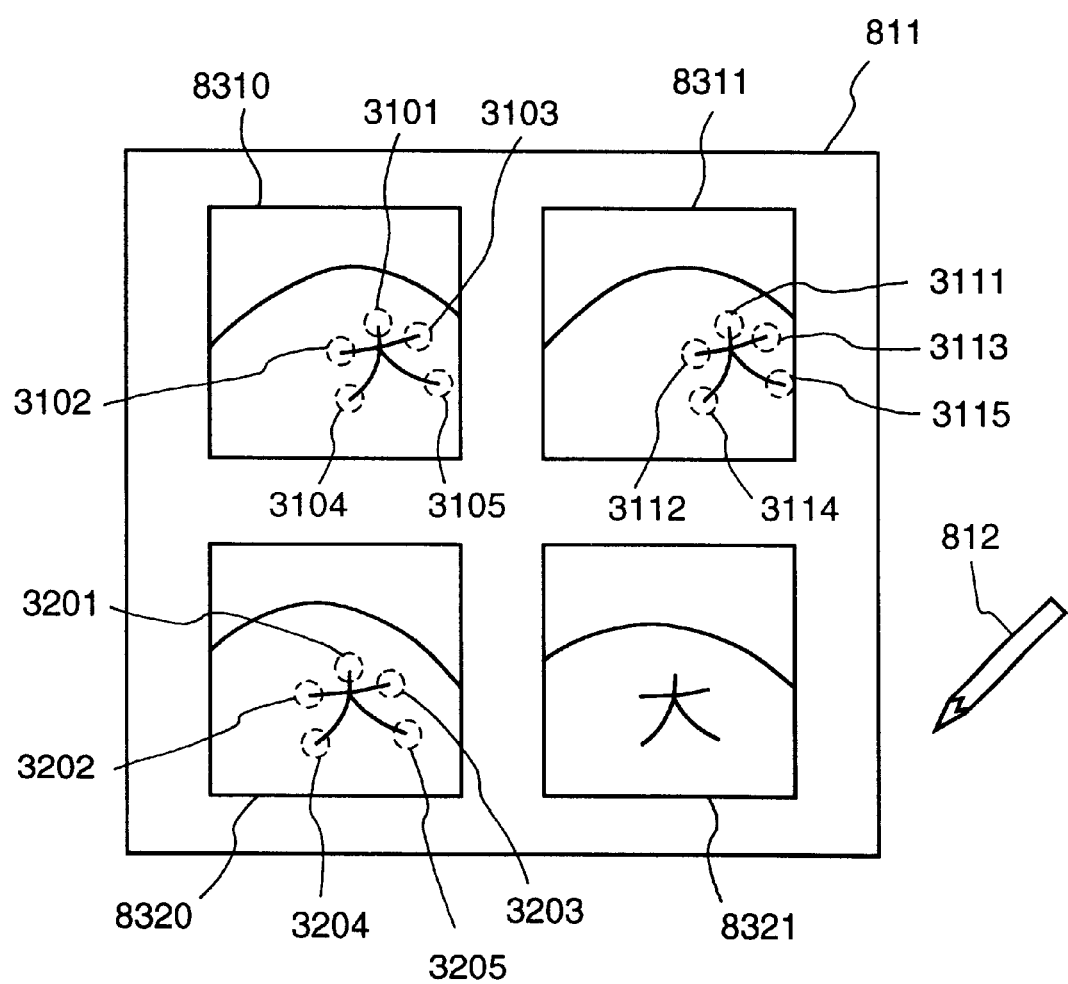
FIG. 31 is a view showing how corresponding points are input.

The processing performed by the corresponding point input unit 810 will be described next with reference to FIG. 31. FIG. 31 shows a state wherein two stereo images are displayed on the monitor of the display device 811.

On the upper portion of the display device 811, first and second images 8310 and 8311 as images at time t are displayed.

On the lower portion of the display device 811, third and fourth images 8320 and 8321 as images at time t+Δt are displayed. The first image 8310 is an image obtained by the image input unit 100 at time t. The third image 8320 is an image obtained by the image input unit 100 at time Δt.

The user Inputs the positions of corresponding points on the stereo images with the pointing device 812 while watching this screen. In the case shown in FIG. 31, points 3201, 3202, 3203, 3204, and 3205 are made to correspond to points 3101, 3102, 3103, 3104, and 3105.

The images displayed on the display device 811 described above based on image data stored in an image memory 1310.

A method of generating a movement vector (Bx,By,Bz) using the moving amount calculation unit 820 will be described next.

Assume that the image input units 100 and 101 move to (Bx,By,Bz) in a time interval Δt, and rotate to the $(\omega,\emptyset,\chi)$ direction.

Figure 33:
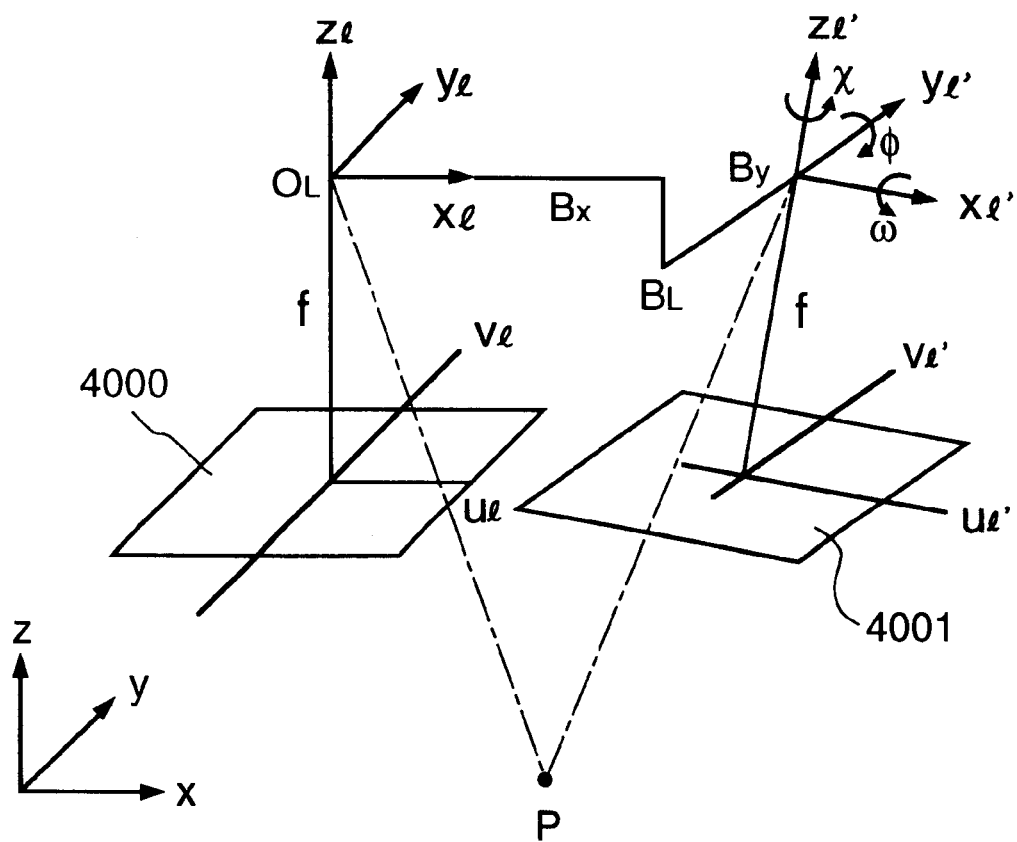
FIG. 33 is a view showing the relationship between images obtained before and after a multi-eye image sensing unit moves.

FIG. 33 shows the coordinate system of images and the state of movement in this case. Assume that images 4000 and 4001 are image sensing planes. Consider a coordinate system $(x_1,y_1,z_1)$ in which the x-axis and the y-axis are respectively parallel to the $u_1$ axis and the $v_1$ axis with a camera principal object $O_L$ serving as the origin. Also, assume that the central position of the image 4000 is set to (0,0,0) and the posture of the image input unit 100 is set to (0,0,0).

In this case, the position of the image input section 100 for sensing an image 4001 is set to $(B_X,B_Y,B_Z)$, and the posture is set to $(\omega,\emptyset,\chi)$. Letting $B_x$ be the unit length, $$\begin{pmatrix} x_1 \\ y_1 \\ z_1 \end{pmatrix} = \begin{pmatrix} u_1 \\ v_1 \\ -f \end{pmatrix}$$

$$\begin{pmatrix} x'_1 \\ y'_1 \\ z'_1 \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} \cos\chi & -\sin\chi & 0 \\ \sin\chi & \cos\chi & 0 \\ 0 & 0 & 1 \end{pmatrix}$$

$$\begin{pmatrix} u_1 \\ v_1 \\ -f \end{pmatrix} + \begin{pmatrix} 1 \\ b_y \\ b_z \end{pmatrix}$$

where by $B_y=B_x$, $b_z=B_z/B_x$, and f is the focal length of the image input units 100 and 101.

In the above determinantal equation, $(b_y/b_x)$ and $(\omega,\emptyset,\chi)$ are determined to satisfy the following determinantal equation and the relationship between a pair of corresponding point coordinate values input from the corresponding point input unit 810:

$$\begin{vmatrix} 1 & b_y & b_z \\ x_1 & y_1 & z_1 \\ x_1 & y_1 & z_1 \end{vmatrix} = \phi$$

That is, in order to determine five unknown values, five or more corresponding point coordinate pairs (ul, vl) and (ul', vl') are input. With substitution of these values into the above equations, the same number of simultaneous equations as the number of input pairs can be obtained. These simultaneous equations are treated for the minimization of the square sum of the obtained equation errors to identify the unknown values $(b_y,b_x)$ and $(\omega,\emptyset,\chi)$. That is, the above unknown values are identified by using the least squares method.

A method of calculating the movement vector $(B_x,B_y,B_z)$ normalized by a baseline length B on the basis of the values $(b_y,b_x)$ and $(\omega,\emptyset,\omega)$ identified in this manner will be described below.

First of all, in order to normalize the obtained moving amounts $b_y$ and $b_z$ by the baseline length B between the image input units 100 and 101, a distance z to a corresponding object point is obtained by using the points 3101, 3111, and 3201 designated as corresponding points on the first, second, and third images 8310, 8311, and 8320.

For the sake of descriptive convenience, assume that the image input units 100 and 101 are arranged parallel, and are moved parallel. In this case, the distance z is obtained from the points 3101 and 3111, as follows:

$$z = fB/d$$

where d is the difference between the points 3101 and 3111 on the image in the $u_1$ coordinate system.

Also, a distance z' is obtained from the points 3101 and 3201 as follows:

$$z' = fB_x/d'$$

where d' is the difference between the points 3101 and 3201 on the image in the ul coordinate system.

In this case, since z=z', $B_x$=d'/dB. Therefore, a relative moving amount $b_y$ is given by:

$$b_y = B_y/B_x$$
$$= B_y/(d'/dB)$$

Similarly, a relative moving amount $b_x$ is given by:

$$b_x = B_z/B_x$$
$$= B_z/(d'/dB)$$

The normalized movement vector $(B_x, B_y, B_z)$ is given by the following determinantal equation:

$$\begin{pmatrix} B_x \\ B_y \\ B_z \end{pmatrix} = \frac{d'}{d} \begin{pmatrix} 1 \\ b_y \\ b_z \end{pmatrix}$$

The movement vector $(B_x, B_y, B_z)$ obtained according to the above sequence of processing and corresponding to each image sensing time point can be sent to a main processing unit 1320.

The processing arrangement of the main processing unit 1320 will be described next with reference to FIG. 32. FIG. 32 shows the detailed processing arrangement of the main processing unit 1320.

The processing arrangement of the main processing unit 1320 will be briefly described first.

Stereo images sensed by the image input units 100 and 101 are input to a distance processing unit 520. The distance to the object point corresponding to each pixel is obtained on the basis of the principle of trigonometrical survey or the like in consideration of the movement vector $(B_x, B_y, B_z)$ input from the moving amount calculation unit 820. The calculation result is output to an image transformation unit 3608 and an image interpolation unit 3605.

The distance processing unit 520 is constituted by a distance calculation unit 510 and an object distance coupling unit 500. This arrangement will be described in detail later.

The image interpolation unit 3605 performs image interpolation processing on the basis of reproduction order data representing the arrangement of the respective viewpoint positions required for image reproduction, corresponding point data input from the corresponding point input unit 810, distance data input from the object distance coupling unit 500, and image data stored in an image memory 1310. The interpolated image is sent to the image transformation unit 3608.

The image transformation unit 3608 performs rotational transformation of the interpolated image on the basis of viewpoint direction data. An image reproduction unit 3606 sends the resultant image to the display I/F 2003 to display the image on the display 2004.

A sequence of processing performed by the distance processing unit 520 will be described next. The distance processing unit 520 performs processing for calculating the object distance.

First of all, the distance calculation unit 510 calculates a distance from corresponding points on stereo images and a given baseline length B by trigonometrical survey without considering the above movement vector.

In this case, corresponding points can be obtained in three ways. The first corresponding point acquisition method is the acquisition method based on block matching described in the first embodiment. The second corresponding point acquisition method is a method of obtaining a distance on the basis of corresponding points input through the corresponding point input unit. Let $Z_{it}$ be the distance to the ith object point obtained at time t. The third corresponding point acquisition method is a method of using both a block matching operation and a corresponding point input operation. More specifically, input corresponding points are directly determined as corresponding points, and corresponding points obtained by the block matching method are used as the remaining points which are not input.

The object distance $Z_{it}$ calculated by the distance calculation unit 510 is input to the object distance coupling unit 500.

The object distance coupling unit 500 obtains the corrected true object distance from the input object distance $Z_{it}$ and the movement vector $(B_x, B_y, B_z)$ input from the distance calculation unit 510.

With reference to the position of the camera (image input units 100 and 101) at time to, the object distance $Z_{it}$ is calculated as:

$$Z_{it}' = Z_{it} + B_z$$

Similarly, moving amounts $B_x$ and $B_y$ are added to coordinates $X_{it}$ and $Y_{it}$ of the object in the X and Y directions to obtain corrected coordinates $X_{it}'$ and $Y_{it}'$.

The number of obtained coordinates of object points increases with time t. By performing an image sensing operation as shown FIG. 5, detailed distance information in a wide range can be obtained.

The true object distance data obtained by the object distance coupling unit 500 is sent to the image interpolation unit 3605 and the image transformation unit 3608.

The image interpolation unit 3605 generates an image viewed from a viewpoint based on reproduction order data (equivalent to the viewpoint locus data 330) by using the interpolation processing method described in the first embodiment. This interpolation method is different from that in the first embodiment in that corresponding points input from the corresponding point input unit 810 are directly used, and the remaining points are obtained by the above block matching method.

The image transformation unit 3608 performs rotational transformation of the image generated by the image interpolation unit 3605 on the basis of the above viewpoint direction data. This method is the same as the rotational transformation method described in the first embodiment, and hence a description thereof will be omitted.

The image transformed on the basis of the viewpoint direction is displayed on the display 2004 by driving the display I/F 2003 through the image reproduction unit 3606.

Figure 34:
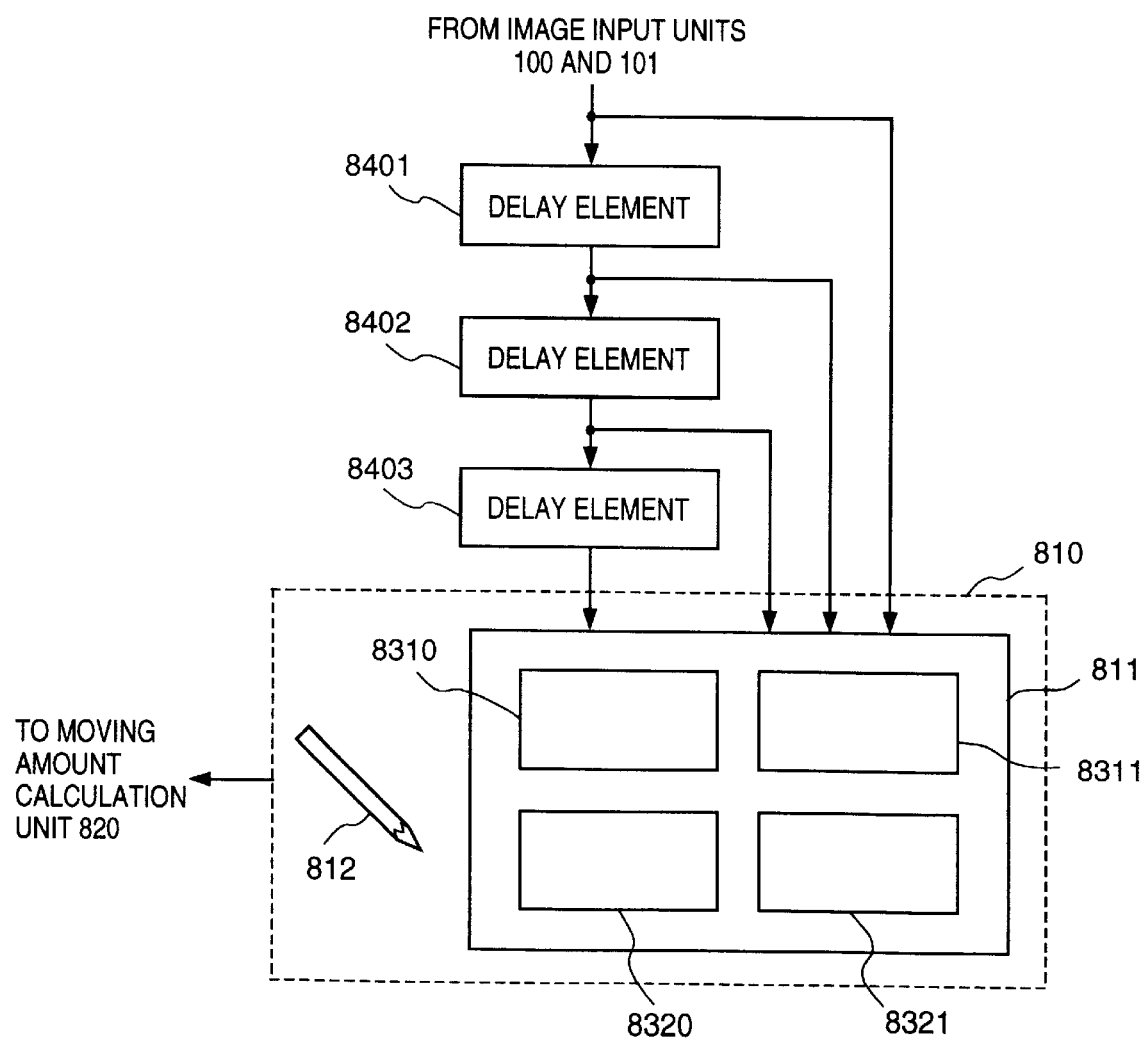
FIG. 34 is a block diagram showing the arrangement of a corresponding-points input unit.

FIG. 34 shows an example of the arrangement of the corresponding point input unit 810 in FIG. 30.

Image data sent from the image input units 100 and 101 are delayed by delay elements 8401, 8402, and 8403 in units of frames and sent to the display device 811 to be displayed on fourth image 8321, respectively.

As described above with reference to FIG. 31, corresponding point coordinates are input by using the pointing device 812. The acquired corresponding point coordinate data is sent to the moving amount calculation unit 820. The representative movement vector $(B_x, B_y, B_z)$ is then generated.

As has been described above, according to this embodiment, the corresponding point designating means is used to obtain corresponding points on images. On the basis of the corresponding points, the representative movement vector of each image input unit (camera) is calculated to generate distance data at a higher resolution. In addition, an interpolated image at a higher resolution can be generated. Consequently, accurate image reproduction can be realized.

Note that each processing unit described above is constituted by a corresponding processing program, which is stored in the ROM 2002 in advance. The MPU 2000 reads out and interprets these programs, and executes them, thereby executing the above processing in each processing unit described above.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    image input means for inputting images;
    detection means for detecting a plurality of moving positions of said image input means in an image input mode;
    storage means for storing a plurality of images input by said image input means at said plurality of moving positions, and moving position information corresponding to the plurality of moving positions detected by said detection means;
    designating means for designating an arbitrary virtual path of a plurality of arbitrary viewpoint positions regardless of a moving locus of said image input means that had been moved in the image input mode and storing the arbitrary virtual path; and
    image reproducing means, in an image reproducing mode, for successively reproducing images stored in said storage means and locating the reproduced images on the virtual path designated by said designating means and generating images by interpolating the plurality of images stored in said storage means in the case that the images corresponding to positions on the virtual path are not stored in said storage means.

2. The apparatus according to claim 1, wherein said image input means outputs a plurality of images obtained by sensing the image from relatively different positions, and stores the images in said storage means.

3. The apparatus according to claim 1, wherein said image input means includes a single-eye image sensing system.

4. The apparatus according to claim 1, wherein said image reproduction means generates an image from an arbitrary viewpoint position by interpolating the plurality of images in response to the moving position information.

5. The apparatus according to claim 4, further comprising viewpoint position input means for inputting coordinates of the arbitrary viewpoint positions.

6. The apparatus according to claim 5, wherein said viewpoint position input means inputs a permutation of coordinates of arbitrary viewpoint positions in correspondence with a reproduction order.

7. The apparatus according to claim 5, wherein said viewpoint position input means further comprises display means for displaying a relationship between a range of images sensed by said image input means and time points of image sensing, and
    inputs coordinates of a viewpoint position in response to the relationship displayed on said display means.

8. The apparatus according to claim 6, wherein said viewpoint position input means further comprises display means for displaying a relationship between a range of images sensed by said image input means and time points of image sensing, and
    inputs coordinates of a viewpoint position on the basis of the relationship displayed on said display means.

9. The apparatus according to claim 6, wherein said viewpoint position input means also inputs a viewpoint direction at the coordinates of the input arbitrary viewpoint position.

10. The apparatus according to claim 6, wherein said viewpoint position input means also inputs a viewpoint direction at the coordinates of the input arbitrary viewpoint position.

11. The apparatus according to claim 5, wherein said image reproducing means comprises:
    combining means for combining a second plurality of images sensed at viewpoint positions near the arbitrary viewpoint position input by said viewpoint position input means, the second plurality of images being stored in said storage means;
    corresponding point detection means for dividing the plurality of combined images into predetermined blocks, and detecting corresponding points on the basis of block matching;
    calculation means for calculating coordinates including a distance to an object to be sensed in response to the detected corresponding points; and
    image generating means for generating an interpolated image corresponding to a viewpoint position input by said viewpoint position input means in response to the corresponding points, the coordinates of the object, and the moving position information.

12. The apparatus according to claim 6, wherein said image reproducing means comprises:
    combining means for combining a third plurality of images sensed at viewpoint positions near a viewpoint position input by said viewpoint position input means, said third plurality of images being stored in said storage means;
    corresponding point detection means for dividing the plurality of combined images into predetermined blocks, and detecting corresponding points in response to block matching;
    calculation means for calculating coordinates including a distance to an object to be sensed in response to the detected corresponding points; and
    image generating means for generating an interpolated image corresponding to a viewpoint position input by said viewpoint position input means in response to the corresponding points, the coordinates of the object, and the moving position information.

13. The apparatus according to claim 11, wherein said corresponding point detection means comprises:
    first corresponding point detection means for detecting, by block matching, corresponding points between a plurality of images which are sensed from different viewpoints at the same time; and
    second corresponding point determination means for performing second corresponding point detection between corresponding points detected by said first detection means at first and second times upon determining that an evaluation function including a predetermined feature amount of the corresponding points at the first and second times and the moving position information is smaller than a predetermined threshold.

14. The apparatus according to claim 13, wherein feature amount is a density.

15. The apparatus according to claim 13, wherein the feature amount includes basic color components.

16. The apparatus according to claim 13, wherein the evaluation function is a function of a distance between a feature amount of corresponding points at the first time and a feature amount of positions obtained by correcting positions of corresponding points at the second time in accordance with moving position information.

17. The apparatus according to claim 13, wherein the threshold is set to be larger with an increase in amount of the moving position information.

18. The apparatus according to claim 13, wherein the threshold is set to be larger as the object is located closer to said designating means.

19. The apparatus according to claim 1, wherein said apparatus comprises display means for displaying an image generated by said image reproducing means on a monitor, and said image reproducing means interpolates an image corresponding to a viewpoint position and a viewpoint direction of a user within a screen of the monitor in response to pieces of image information stored in said storage means, and outputs the interpolated image to said display means.

20. The apparatus according to claim 1, further comprising reproduction order setting means for setting an order in which images are reproduced by said reproducing means.

21. An image sensing method comprising:

image input step for inputting an image using image input means which is movably supported;

detection step for detecting a plurality of moving positions based on a state of movement of said image input means in an image input mode;

storage step for storing a plurality of images input at said image input step and moving position information corresponding to the plurality of moving positions detected in said detection step;

designating step of designating an arbitrary virtual path of a plurality of arbitrary viewpoint positions regardless of a moving locus of said image input means that had been moved in the image input mode and storing the arbitrary virtual path; and image reproducing step, in an image reproducing mode, of successively reproducing images stored in said storage step and locating the reproduced images on the virtual path designated in said designating step and generating images by interpolating the plurality of images stored in said storage step in the case that the images corresponding to positions on the virtual path are not stored in said storage step.

22. The image sensing method of claim 21, wherein said detection step comprises a step of detecting a plurality of moving positions based on an angular velocity of said image imput means.

23. The method according to claim 21, wherein said image input step includes a step for outputting a plurality of images obtained by sensing the image from relatively different positions.

24. The method according to claim 21, wherein said image input step makes use of a single-eye image sensing system having one image sensing system.

25. The method according to claim 21, wherein at said image reproducing step an image from the arbitrary viewpoint position by interpolating the plurality of images in response to the moving position information is generated.

26. The method according to claim 25, further comprising viewpoint position input step for inputting coordinates of the arbitrary viewpoint position.

27. The method according to claim 25, where at said viewpoint position input step a permutation of coordinates of arbitrary viewpoint positions in correspondence with a reproduction order is input.

28. The method according to claim 26, wherein said viewpoint position input step further comprises display step for displaying a relationship between a range of images sensed by said image input step and time points of image sensing, and inputting coordinates of a viewpoint position in response to the relationship displayed on said display step.

29. The method according to claim 27, wherein said viewpoint position input step further comprises display step for displaying a relationship between a range of images sensed by said image input step and time points of image sensing, and inputting coordinates of a viewpoint position in response to the relationship displayed on said display step.

30. The method according to claim 26, wherein at said viewpoint position input step a viewpoint direction at the coordinates of the input arbitrary viewpoint position is also input.

31. The method according to claim 27, wherein at said viewpoint position input step a viewpoint direction at the coordinates of the input arbitrary viewpoint position is also input.

32. The method according to claim 26, wherein said image reproducing step comprises:

combining step for combining a fourth plurality of images sensed at viewpoint positions near a viewpoint position input by said viewpoint position input step, said fourth plurality of images being stored in said storage step;

corresponding point detection step for dividing the plurality of combined images into predetermined blocks, and detecting corresponding points in response to block matching;

calculation step for calculating coordinates including a distance to an object to be sensed in response to the detected corresponding points; and image generating step for generating an interpolated image corresponding to a viewpoint position input by said viewpoint position input step in response to the corresponding points, the coordinates of the object, and the moving position information.

33. The method according to claim 27, wherein said image reproducing step comprises:

combining step for combining a fifth plurality of images sensed at viewpoint positions near a viewpoint position input by said viewpoint position input step, the fifth plurality of images being stored in said storage step;

corresponding point detection step for dividing the plurality of combined images into predetermined blocks, and detecting corresponding points in response to block matching;

calculation step for calculating coordinates including a distance to an object to be sensed in response to the detected corresponding points; and image generating step for generating an interpolated image corresponding to a viewpoint position input by said viewpoint position input step in response to the corresponding points, the coordinates of the object, and the moving position information.

34. The method according to claim 32, wherein said corresponding point detection step comprises:

first corresponding point detection step for detecting, by block matching, corresponding points between a plurality of images which are sensed from different viewpoints at the same time; and second corresponding point determination step for performing second corresponding point detection between corresponding points detected by said first detection step at first and second times upon determining that an evaluation function including a predetermined feature amount of the corresponding points at the first and second times and the moving position information is smaller than a predetermined threshold.

35. The method according to claim 34, wherein the feature amount is a density.

36. The method according to claim 34, wherein the feature amount includes basic color components.

37. The method according to claim 34, wherein the evaluation function is a function of a distance between a feature amount of corresponding points at the first time and a feature amount of positions obtained by correcting positions of corresponding points at the second time in accordance with the moving position information.

38. The method according to claim 34, wherein the threshold is set to be larger with an increase in amount of the moving position information.

39. The method according to claim 34, wherein the threshold is set to be larger as the object is located closer to said designating step.

40. The image sensing apparatus of claim 1, wherein said detection means comprises means for detecting a plurality of moving positions based on an angular velocity of said image imput means.

* * * * *

UNITED STATES PATENT AND TRADEMARK OFFICE
CERTIFICATE OF CORRECTION

PATENT NO.   : 6,839,081 B1
DATED        : January 4, 2005
INVENTOR(S)  : Iijima et al.

It is certified that error appears in the above-identified patent and that said Letters Patent is hereby corrected as shown below:

Column 3,
Line 6, delete "met hod" and insert therefore -- method --.

Column 5,
Line 40, delete "$\sqrt{Bx^2 \, 0 \, By^2 \, 0 \, Bz^2}$" and insert therefore -- $\sqrt{Bx^2 + By^2 + Bz^2}$ --

Column 13,
Line 48, delete "d ZOO" and insert therefore -- a zoo --.

Column 20,
Line 17, delete "$B_y=B_x$" and insert therefore -- $b_y=By/Bx$ --.
Line 17, delete "$(b_y/b_x)$" and insert therefore -- $(b_y,b_x)$ --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,839,081 B1  Page 1 of 1
APPLICATION NO. : 08/525289
DATED : January 4, 2005
INVENTOR(S) : Iijima et al.

It is certified that error appears in the above-identified patent and that said Letters Patent is hereby corrected as shown below:

On the cover page

Section (56), References Cited, add:

| | | | | |
|---|---|---|---|---|
| 5,495,576 A | * | 2/1996 | Ritchey | 345/420 |
| 5,014,126 A | * | 5/1991 | Pritchard et al. | 348/42 |
| 5,422,653 A | * | 6/1995 | Maguire | 345/9 |
| 5,282,029 A | * | 1/1994 | Lawrence et al. | 348/44 |
| 5,424,773 A | * | 6/1995 | Saito | 348/218.1 |
| 5,625,408 A | * | 4/1997 | Matsugu et al. | 348/42 |
| 5,444,479 A | * | 8/1995 | Fernekes et al. | 348/42 |
| 5,140,415 A | * | 8/1992 | Choquet | 348/46 |

Column 3,
Line 6, delete "met hod" and insert therefore -- method --.

Column 5,
Line 40, delete " $\sqrt{Bx^2 0 By^2 0 Bz^2}$ " and insert therefore -- $\sqrt{Bx^2 + By^2 + Bz^2}$ --.

Column 13,
Line 48, delete "d ZOO" and insert therefore -- a zoo --.

Column 20,
Line 17, delete "$B_y=B_x$" and insert therefore -- $b_y=By/Bx$ --.
Line 17, delete "$(b_y/b_x)$" and insert therefore -- $(b_y,b_x)$ --.

Signed and Sealed this

Eleventh Day of March, 2008

JON W. DUDAS
*Director of the United States Patent and Trademark Office*